United States Patent
Dahl et al.

(10) Patent No.: US 10,837,323 B2
(45) Date of Patent: Nov. 17, 2020

(54) FOUR-STROKE INTERNAL COMBUSTION ENGINE THERETO RELATED VEHICLE AND METHOD

(71) Applicant: Scania CV AB, Södertälje (SE)

(72) Inventors: Andreas Dahl, Nyköping (SE); Eric Olofsson, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/498,819

(22) PCT Filed: Mar. 27, 2018

(86) PCT No.: PCT/SE2018/050326
§ 371 (c)(1),
(2) Date: Sep. 27, 2019

(87) PCT Pub. No.: WO2018/182491
PCT Pub. Date: Oct. 4, 2018

(65) Prior Publication Data
US 2020/0040774 A1 Feb. 6, 2020

(30) Foreign Application Priority Data
Mar. 31, 2017 (SE) ...................... 1750392

(51) Int. Cl.
*F01L 1/06* (2006.01)
*F02D 13/02* (2006.01)
(Continued)

(52) U.S. Cl.
CPC .................. *F01L 1/06* (2013.01); *F01L 1/04* (2013.01); *F01L 13/0036* (2013.01); *F02D 13/0207* (2013.01); *F02D 13/0261* (2013.01)

(58) Field of Classification Search
CPC ..... F01L 1/047; F01L 1/06; F01L 1/46; F01L 9/025; F01L 13/0005; F01L 2013/001;
(Continued)

(56) References Cited

U.S. PATENT DOCUMENTS 4,664,070 A    5/1987   Meistrick et al.
5,507,254 A *   4/1996   Melchior .................. F16D 3/10
                                                  123/90.17

(Continued)

FOREIGN PATENT DOCUMENTS

EP    1691041 A2    8/2006
EP    2184451 A1    5/2010
(Continued)

OTHER PUBLICATIONS

Scania CV AB, International Application No. PCT/SE2018/050326, International Preliminary Report on Patentability, dated Oct. 1, 2019.

(Continued)

*Primary Examiner* — Jorge L Leon, Jr.
(74) *Attorney, Agent, or Firm* — Moore & Van Allen PLLC; W. Kevin Ransom

(57) ABSTRACT

A four-stroke internal combustion engine is disclosed. A camshaft and a crankshaft if the engine are synchronized to rotate at a same rotational speed. A first linkage arrangement is configured to change the motion of an exhaust valve head. A second linkage arrangement is configured to change the motion of the intake valve head. A control unit is configured for controlling the first linkage arrangement to selectively prevent the motion of the exhaust valve head and for controlling the second linkage arrangement to selectively prevent the motion of the intake valve head.

14 Claims, 11 Drawing Sheets

(51) Int. Cl.
*F01L 1/04* (2006.01)
*F01L 13/00* (2006.01)

(58) Field of Classification Search
CPC ..... F01L 13/0036; F01L 13/06; F01L 13/085; F01L 2760/003; F02D 13/0207; F02D 13/04; F02D 13/06
USPC ......... 123/90.12, 90.13, 90.15, 90.16, 90.17, 123/481, 198 F
See application file for complete search history.

(56) References Cited

U.S. PATENT DOCUMENTS

| | | | |
|---|---|---|---|
| 5,996,550 | A | 12/1999 | Israel et al. |
| 6,237,551 | B1 | 5/2001 | Macor et al. |
| 6,244,257 | B1 | 6/2001 | Hu |
| 7,464,675 | B1 | 12/2008 | Schechter |
| 2001/0054403 | A1* | 12/2001 | Fujii ............... F01L 13/0036 123/90.15 |
| 2006/0021606 | A1* | 2/2006 | Bryant ............. F01L 13/0015 123/562 |
| 2006/0266030 | A1* | 11/2006 | Solomon ............... F01K 7/36 60/508 |
| 2007/0144467 | A1 | 6/2007 | Sailer et al. |
| 2010/0269806 | A1* | 10/2010 | Kreuter ............... F02B 41/06 123/70 R |
| 2012/0192818 | A1 | 8/2012 | Meldolesi et al. |
| 2013/0112160 | A1 | 5/2013 | Ohsawa |
| 2016/0146072 | A1 | 5/2016 | Ernest et al. |

FOREIGN PATENT DOCUMENTS

| | | |
|---|---|---|
| GB | 2402708 A | 12/2004 |
| WO | 9719260 A1 | 5/1997 |
| WO | 9834014 A1 | 8/1998 |
| WO | 2013081444 A1 | 6/2013 |
| WO | 2017213566 A1 | 12/2017 |

OTHER PUBLICATIONS

SCANIA CV AB, International Application No. PCT/SE2018/050326, International Search Report, dated Jun. 8, 2018.
SCANIA CV AB, International Application No. PCT/SE2018/050326, Written Opinion, dated Jun. 8, 2018.
SCANIA CV AB, Swedish Application No. 1750392-1, Office Action, dated Nov. 23, 2017.
SCANIA CV AB, Swedish Application No. 1750392-1, Office Action, dated Jun. 11, 2018.
SCANIA CV AB, Swedish Application No. 1750995-1, Office Action, dated Jun. 8, 2018.
SCANIA CV AB, Swedish Application No. 1750995-1, Office Action, dated Jan. 31, 2019.

* cited by examiner

FOUR-STROKE INTERNAL COMBUSTION ENGINE THERETO RELATED VEHICLE AND METHOD

CROSS-REFERENCE TO RELATED APPLICATIONS

This application is a national stage application (filed under 35 § U.S.C. 371) of PCT/SE2018/050326, filed Mar. 27, 2018 of the same title, which, in turn, claims priority to Swedish Application No. 1750392-1 filed Mar. 31, 2017; the contents of each of which are hereby incorporated by reference.

FIELD OF THE INVENTION

The invention relates to a four-stroke internal combustion engine. The invention further relates to a vehicle comprising a four-stroke internal combustion engine. In addition, the invention relates to a method for controlling a four-stroke internal combustion engine. According to further aspects, the invention relates to a computer program for performing a method for controlling a four-stroke internal combustion engine, as well as a computer program product for performing a method for controlling a four-stroke internal combustion engine.

BACKGROUND OF THE INVENTION

GB 2402708 discloses a selectable two-stroke/four-stroke lost-motion valve actuation system for an internal combustion engine. Camshafts of the engine are driven at engine speed and each cam has an actuating profile of duration at least the same in numerical value as the intended valve opening duration for the engine in four-stroke mode. In four-stroke mode the lost-motion is controlled to deactivate one cam event in every two revolutions of the camshafts while in two-stroke mode the lost-motion is controlled to permit activation of every cam event on the camshafts and at the same time modify the duration of each cam event to produce a shorter valve opening duration. The camshafts are driven at engine speed only in order to enable a hybrid two-stroke/four-stroke internal combustion engine.

A piston of a four-stroke internal combustion engine, ICE, performs four-strokes, an intake stroke, a compression stroke, a power stroke, and an exhaust stroke in a cylinder of the ICE. During ordinary operation of the ICE, air is drawn into the cylinder during the intake stroke, the air is compressed during the compression stroke. A certain amount of energy is added as fuel is injected into the cylinder when the piston is around its top dead centre, TDC. The fuel combusts and expands during the power stroke. During the exhaust stroke exhaust gases are ejected from the cylinder. Thus, a crankshaft of the ICE is driven by the piston or pistons of the ICE.

Some four-stroke ICE:s may be operated in alternative modes such as a mode in which a piston brakes a rotation of the crankshaft. In this manner, an internal load may be put on the four-stroke ICE. For instance, such an internal load may be utilized for reducing a rotational speed of the crankshaft, or for producing hot exhaust gases from other cylinders of the relevant four-stroke ICE, which in turn may heat up a catalytic reduction system for exhaust gases of the four-stroke ICE. Some four-stroke ICE:s may be operated in a mode in which no air passes through a cylinder of the four-stroke ICE. In this manner, a cylinder of a four-stroke ICE may be shut off during periods when the four-stroke ICE is subjected to low loads. Since no air passes through the cylinder, a catalytic reduction system of the four-stroke ICE is not cooled down.

Accordingly, a modern four-stroke ICE benefits from being able to be operated not only in an ordinary engine running mode but also in other modes.

SUMMARY OF THE INVENTION

It is an object of the invention to provide a four-stroke internal combustion engine, ICE, that permits operation in different modes.

According to an aspect of the invention, the object is achieved by a four-stroke internal combustion engine comprising at least one cylinder arrangement, a crankshaft, and at least one camshaft. The at least one cylinder arrangement forms a combustion chamber and comprises a cylinder bore, a piston arranged to reciprocate in the cylinder bore, a connecting rod connecting the piston with the crankshaft, an exhaust arrangement for outflow of exhaust gas from the cylinder bore, and an intake arrangement for intake of fresh gas into the cylinder bore. The piston performs four-strokes in the cylinder bore, corresponding to an intake stroke, a compression stroke, a power stroke, and an exhaust stroke. The exhaust arrangement comprises an exhaust valve and an exhaust opening, the exhaust valve comprising an exhaust valve head configured to seal against an exhaust valve seat of the exhaust opening. The intake arrangement comprises an intake valve and an intake opening, the intake valve comprising an intake valve head configured to seal against an intake valve seat of the intake opening. The at last one camshaft comprises a first lobe configured to cause a motion of the exhaust valve head for opening and closing the exhaust opening. The at least one camshaft comprises a second lobe configured to cause a motion of the intake valve head for opening and closing the intake opening. The at least one camshaft is synchronized with the crankshaft to rotate at a same rotational speed as the crankshaft. The exhaust arrangement comprises a first linkage arrangement configured to change the motion of the exhaust valve head caused by the first lobe, and the intake arrangement comprises a second linkage arrangement configured to change the motion of the intake valve head caused by the second lobe. The four-stroke internal combustion engine comprises a control unit configured for controlling the first linkage arrangement to selectively prevent the motion of the exhaust valve head and configured for controlling the second linkage arrangement to selectively prevent the motion of the intake valve head, wherein the cylinder arrangement is configured to drive the crankshaft in a four-stroke engine running mode only.

Since the at least one camshaft is synchronized with the crankshaft to rotate at a same rotational speed as the crankshaft, the at least one camshaft together with the first and second lobes will perform two revolutions while the crankshaft rotates the two revolutions required for the piston to perform its four-strokes, as opposed to a camshaft performing only one revolution while the crankshaft rotates its two revolutions, as in an ordinary four-stroke ICE. Since the exhaust arrangement comprises a first linkage arrangement configured to change the motion of the exhaust valve head caused by the first lobe, and the intake arrangement comprises a second linkage arrangement configured to change the motion of the intake valve head caused by the second lobe, movements of the exhaust valve head and the intake valve head can be manipulated. Since, the four-stroke internal combustion engine comprises a control unit configured for controlling the first linkage arrangement to selectively prevent the motion of the exhaust valve head and configured for controlling the second linkage arrangement to selectively prevent the motion of the intake valve head, particular movements of the exhaust valve head and/or the intake valve head otherwise caused by the first and second lobes may be prevented to achieve a particular opening and closing pattern of the exhaust valve head and the intake valve head for a particular mode of operation of the internal combustion engine. Accordingly, the four-stroke internal combustion engine is easily adaptable to particular kinds of modes of operation. As a result, the above-mentioned object is achieved.

In the ICE known from GB 2402708, the camshafts only rotate at the same rotational speed as the crankshaft in order to operate the ICE either in a two-stroke mode or in a four-stroke mode. That is, the crankshaft of the ICE may be driven in both a two-stroke and a four-stroke engine running mode.

In contrast, the cylinder arrangement of the four-stroke ICE of the present invention is configured to drive the crankshaft in a four-stroke engine running mode only, i.e. the ICE of the present invention is a dedicated four stroke ICE.

More specifically, the provision of the camshaft rotating at the same rotational speed as the crankshaft in a dedicated four-stroke ICE provides for the first lobe to move the exhaust valve head not only during the exhaust stroke but also during the compression stroke. Similarly, this provides for the second lobe to move the intake valve head that not only during the intake stroke but also during the power stroke. Flexibility related to the opening of the exhaust and intake valve heads is provided by the first and second linkage arrangements. Thus, in order to achieve a particular mode of operation of the four-stroke ICE, the control unit will control the first linkage arrangement to selectively prevent the exhaust valve head from opening during the compression stroke and/or the exhaust stroke, and/or to selectively prevent the intake valve head from opening during the intake stroke and/or the power stroke.

Accordingly, a four-stroke ICE is provided which is flexibly adaptable to a number of different operational modes, such e.g. an ordinary engine running mode, i.e. the four-stroke engine running mode, in which in which fuel is added to the cylinder bore in order for the piston to drive the crankshaft, and an engine braking mode in which no fuel is added to the cylinder bore, and in which the piston brakes the crankshaft.

It has been realized by the inventors that linkage arrangements may be utilized for selectively prevent a motion of an exhaust valve head and an intake valve head in a four-stroke ICE having at least one camshaft rotating at a same rotational speed as a crankshaft of the ICE in order to achieve different operational modes of the ICE by opening and not opening exhaust and intake valve heads according to different patterns during two complete revolutions of the at last one camshaft and the crankshaft.

The four-stroke ICE may comprise more than one cylinder arrangement, each cylinder arrangement forming a combustion chamber and comprising a cylinder bore, a piston arranged to reciprocate in the cylinder bore, a connecting rod connecting the piston with the crankshaft, an exhaust arrangement for outflow of exhaust gas from the cylinder bore, and an intake arrangement for intake of fresh gas into the cylinder bore.

The combustion chamber is arranged inside the cylinder arrangement, above the piston. Intake air enters the combustion chamber through the intake arrangement of the cylinder arrangement during the intake stroke of the piston. The intake air may be compressed by a turbocharger. The internal combustion engine may be e.g. a compression ignition CI engine, such as a Diesel type engine, or a spark ignition engine, such as an Otto type engine and comprises in the latter case a sparkplug or similar device in the cylinder arrangement. In the engine running mode, fuel may be injected into the combustion chamber during part of the compression stroke or intake stroke of the piston, or may be entrained with the intake air. The fuel may ignite near the TDC between the compression stroke and the power stroke of the piston. The camshaft being synchronized with the crankshaft to rotate at a same rotational speed as the crankshaft means that the camshaft and the crankshaft have the same angular velocity, $\omega$.

The cylinder arrangement being configured to drive the crankshaft in a four-stroke engine running mode only means that power is supplied from the cylinder arrangement to the crankshaft only by operation according to the four-stroke principle, and not according to any other combustion principle, such as e.g. the two-stroke principle. As mentioned above, according to the four-stroke principle, the piston of the cylinder arrangement performs an intake stroke, a compression stroke, a power stroke, and an exhaust stroke in the cylinder bore of the cylinder arrangement.

As mentioned above, each of the first and second lobes is configured to cause a motion of the respective valve head for opening and closing the exhaust opening and the intake opening, respectively. This means that each of the first and second lobes forms a distinct lobe, such that before and after each of the first and second lobes, the respective opening remains closed.

According to embodiments, the at least one camshaft may comprise a third lobe configured to cause a motion of the exhaust valve head for opening and closing the exhaust opening, and the at least one camshaft may comprise a fourth lobe configured to cause a motion of the intake valve head for opening and closing the intake opening. The control unit may be configured for controlling the first linkage arrangement to selectively prevent the motion of the exhaust valve head otherwise caused by the third lobe, and the second linkage arrangement to selectively prevent the motion of the intake valve head otherwise caused by the fourth lobe. In this manner, further options for controlling opening and closing of the exhaust valve head and of the intake valve head may be provided for operating the ICE in different modes, e.g. of the kinds mentioned above and optionally also a zero flow mode, see below.

For instance, the third lobe may move the exhaust valve head during the intake stroke and/or during the power stroke, unless the first linkage arrangement prevents the motion of the exhaust valve head. Similarly, the fourth lobe may move the intake valve head during the compression stroke and/or during the exhaust stroke, unless the second linkage arrangement prevents the motion of the intake valve head.

Again, each of the third and fourth lobes forms a distinct lobe, such that before and after each of the third and fourth lobes, the respective opening remains closed. In particular, in between the first and third lobes, the exhaust opening remains closed, and in between the second and fourth lobes, the intake opening remains closed.

According to a further aspect of the invention there is provided a vehicle comprising a four-stroke internal combustion engine according to any one of aspects and/or embodiments discussed herein.

According to a further aspect of the invention there is provided a method for controlling a four-stroke internal combustion engine, the four-stroke internal combustion engine comprising at least one cylinder arrangement, a crankshaft, and at least one camshaft. The at least one cylinder arrangement forms a combustion chamber and comprises a cylinder bore, a piston arranged to reciprocate in the cylinder bore, a connecting rod connecting the piston with the crankshaft, an exhaust arrangement for outflow of exhaust gas from the cylinder bore, and an intake arrangement for intake of fresh gas into the cylinder bore. The piston performs four-strokes in the cylinder bore, corresponding to an intake stroke, a compression stroke, a power stroke, and an exhaust stroke. The exhaust arrangement comprises an exhaust valve and an exhaust opening, the exhaust valve comprising an exhaust valve head configured to seal against an exhaust valve seat of the exhaust opening. The intake arrangement comprises an intake valve and an intake opening, the intake valve comprising an intake valve head configured to seal against an intake valve seat of the intake opening. The at least one camshaft comprises a first lobe configured to cause a motion of the exhaust valve head for opening and closing the exhaust opening, and the at least one camshaft comprises a second lobe configured to cause a motion of the intake valve head for opening and closing the intake opening. The method comprises steps of:

rotating the at least one camshaft at a same rotational speed as the crankshaft, changing the motion of the exhaust valve head caused by the first lobe by means of a first linkage arrangement comprised in the exhaust arrangement, changing the motion of the intake valve head caused by the second lobe by means of a second linkage arrangement comprised in the intake arrangement, wherein the step of changing the motion of the exhaust valve head comprises a step of:

selectively preventing the motion of the exhaust valve head by means of the first linkage arrangement, and wherein the step of changing the motion of the intake valve head comprises a step of:

selectively preventing the motion of the intake valve head by means of the second linkage arrangement), wherein the cylinder arrangement is configured to drive the crankshaft in a four-stroke engine running mode only, wherein in the four-stroke engine running mode, the step of selectively preventing the motion of the exhaust valve head comprises a step of:

preventing the motion of the exhaust valve head otherwise caused by the first lobe at every alternate rotation of the at least one camshaft, such that the exhaust opening remains closed during the compression stroke, and wherein the step of selectively preventing the motion of the intake valve head comprises a step of:

preventing the motion of the intake valve head otherwise caused by the second lobe at every alternate rotation of the at least one camshaft such that the intake opening remains closed during the power stroke.

According to a further aspect of the invention there is provided a computer program for performing a method for controlling a four-stroke internal combustion engine, wherein the computer program comprises computer readable code configured to cause a one or more calculation units of one or more control units to perform a method according to any one of aspects and/or embodiments discussed herein.

According to a further aspect of the invention there is provided a computer program product for performing a method for controlling a four-stroke internal combustion engine, wherein the computer program product comprises computer readable code configured to cause a one or more calculation units of one or more control units to perform a method according to any one of aspects and/or embodiments discussed herein.

Further features of, and advantages with, the invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION OF THE INVENTION

Aspects of the invention will now be described more fully. Like numbers refer to like elements throughout. Well-known functions or constructions will not necessarily be described in detail for brevity and/or clarity. When in the following reference is made to an ICE, or to the ICE, a four-stroke ICE is meant. The engine running mode discussed in the following is a four-stroke engine running mode.

Figure 1:
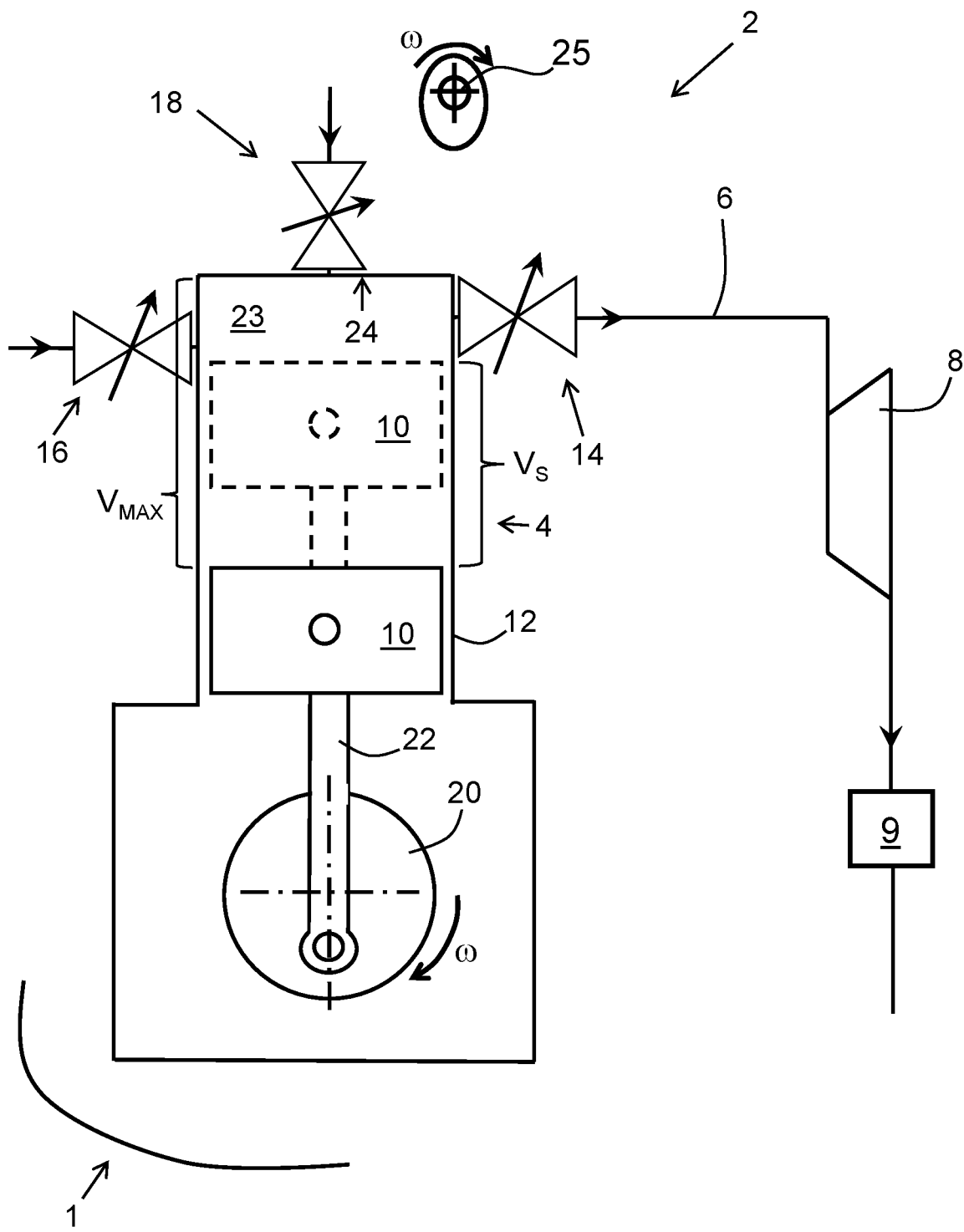
FIG. 1 schematically illustrates a four-stroke internal combustion engine, ICE, according to embodiments, FIG. 2 schematically illustrates a cylinder arrangement of the four-stroke ICE of FIG. 1, FIG. 3 schematically illustrates a four-stroke ICE according to embodiments.

FIG. 1 schematically illustrates a four-stroke internal combustion engine, ICE, 2 according to embodiments. The ICE 2 comprises at least one cylinder arrangement 4, a crankshaft 20, and at least one camshaft 25. FIG. 1 also schematically illustrates a vehicle 1 comprising an ICE 2 according to any one of aspects and/or embodiments disclosed herein. The vehicle 1 may be e.g. a heavy vehicle such as a truck or a bus. The vehicle 1 comprises a four-stroke ICE 2 according to any one of aspects and/or embodiments discussed herein, i.e. not only the ICE 2 of the embodiments of FIG. 1, but alternatively according to the other embodiments discussed herein. Moreover, the ICE 2 of the vehicle 1 may be controlled according to a method according to aspects and/or embodiments discussed herein.

The at least one cylinder arrangement 4 comprises a piston 10, a cylinder bore 12, an exhaust arrangement 14, an intake arrangement 16, and a fuel injection arrangement 18, and/or an ignition device. The piston 10 is arranged to reciprocate in the cylinder bore 12. The piston 10 performs four strokes in the cylinder bore 12, corresponding to an intake stroke, a compression stroke, a power stroke, and an exhaust stroke. In accordance with the invention, other tasks than fresh gas intake, compression, combustion, and exhaust gas ejection may be performed during the respective strokes. However, for the sake of clarity, herein the strokes will be named according to the common terminology, i.e. intake stroke, compression stroke, power stroke, and exhaust stroke. The at least one camshaft 25 rotates at a same rotational speed ω as the crankshaft 20.

In FIG. 1 the piston 10 is illustrated with continuous lines at its bottom dead centre, BDC, and with dashed lines at its top dead centre, TDC. The cylinder arrangement 4 has a maximum volume, $V_{MAX}$, between the BDC of the piston 10 and an upper inner delimiting surface 24 of a combustion chamber 23. The combustion chamber 23 is formed above the piston 10 inside the cylinder arrangement 4. A connecting rod 22 connects the piston 10 with the crankshaft 20. The ICE 2 may comprise an exhaust conduit 6 and at least one turbine 8 connected to the exhaust arrangement 14. Exhaust gases from the ICE 2 may be cleaned in a cleaning system 9, such as e.g. a catalytic reduction system.

The cylinder arrangement 4 has a total swept volume, $V_S$, in the cylinder bore 12 between the BDC and the TDC. The cylinder arrangement 4 has a compression ratio, ε. $V_{MAX}$ may be expressed as: $V_{MAX}=V_S*(\varepsilon/(\varepsilon-1))$.

The exhaust arrangement 14 comprises an exhaust valve and an exhaust opening and the intake arrangement 16 comprises an intake valve and an intake opening, as will be discussed below with reference to FIG. 2. The exhaust arrangement 14 is arranged for outflow of exhaust gases from the cylinder bore 12. The exhaust arrangement 14 is configured to open and close the exhaust opening during an exhaust sequence of the piston reciprocation. According to some embodiments, the exhaust sequence may start before the piston 10 reaches its BDC during the power stroke and may end around the TDC of the piston between the exhaust stroke and the intake stroke. The intake arrangement 16 is configured for intake of fresh gas into the cylinder bore 12. The intake arrangement 16 is configured to open and close the intake opening during an intake sequence of the piston reciprocation. According to some embodiments, the intake sequence may start around the TDC of the piston 10 between the exhaust stroke and of the intake stroke and may end around the BDC of the piston 10 between the intake stroke and the compression stroke.

Figure 2:
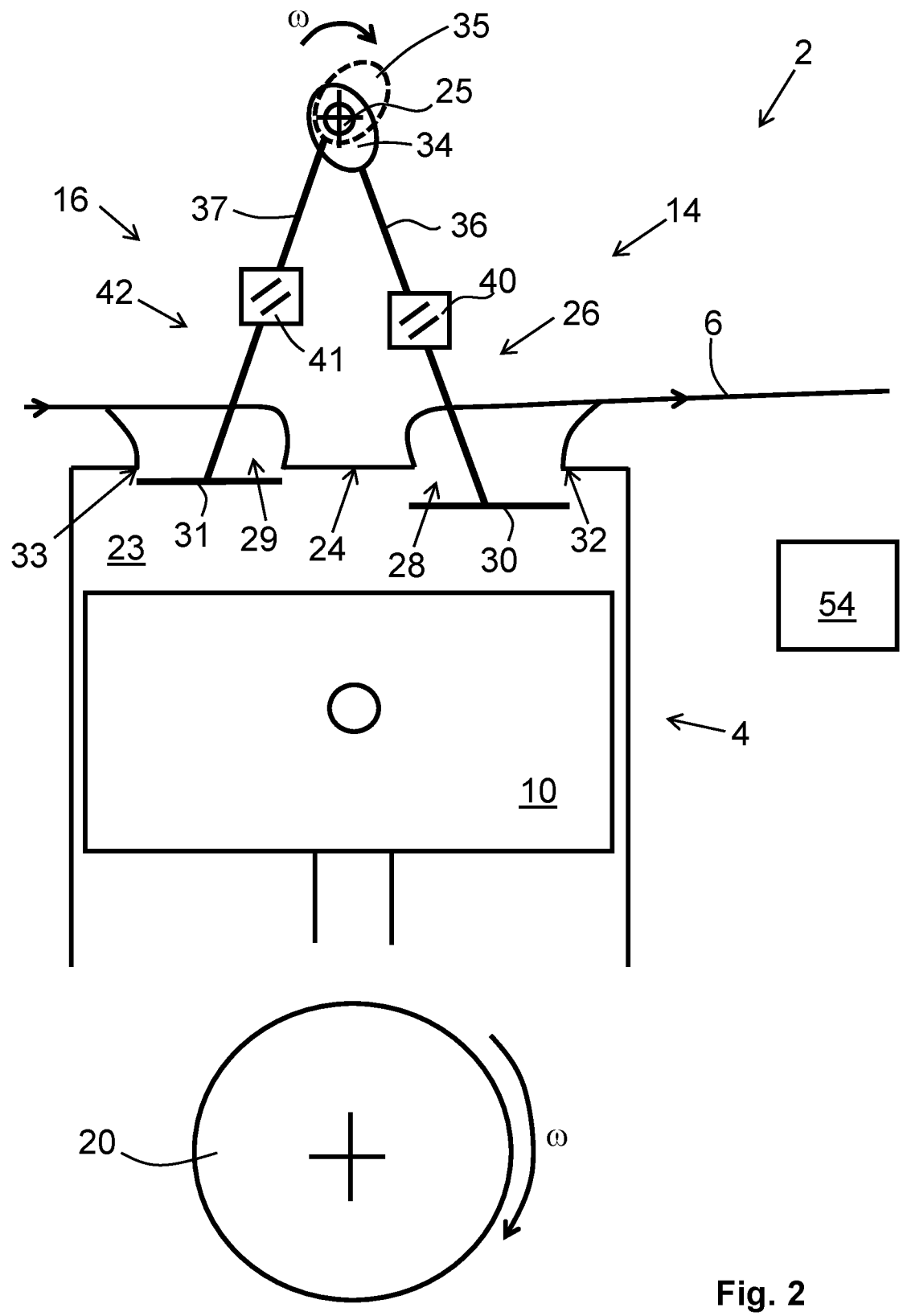

FIG. 2 schematically illustrates the at least one cylinder arrangement 4 of the ICE 2 of FIG. 1. In particular, the exhaust arrangement 14 and in the intake arrangement 16 are shown in more detail.

The exhaust arrangement 14 comprises an exhaust valve 26 and an exhaust opening 28. The exhaust gases flow out from the combustion chamber 23 through the exhaust opening 28 when the exhaust valve 26 is open. The exhaust valve 26 comprises an exhaust valve head 30 configured to seal against an exhaust valve seat 32 extending around the exhaust opening 28. The exhaust valve seat 32 may be provided in the cylinder arrangement 4 e.g. at the upper inner delimiting surface 24 of the combustion chamber 23. The intake arrangement 16 comprises an intake valve 42 and an intake opening 29. Fresh gas enters the combustion chamber 23 through the intake opening 29 when the intake valve 42 is open. The intake valve 42 comprises an intake valve head 31 configured to seal against an intake valve seat 33 extending around the intake opening 29.

The camshaft 25 is arranged for controlling movement of the exhaust valve 26, and opening and closing of the exhaust valve 26. Namely, the camshaft 25 comprises a first lobe 34 configured to abut against the exhaust valve 26. Thus, at least a portion of the exhaust valve 26 will follow a contour of the first lobe 34. Accordingly, the first lobe 34 is configured to cause a motion of the exhaust valve head 30 for opening and closing the exhaust opening 28. Put differently, the first lobe 34 provides an input to the valve head 30, i.e. the first lobe 34 forms a cam, which is followed by an end portion 36 of the exhaust valve 26. The first lobe 34 is eccentrically arranged on the camshaft 25. The end portion 36 of the exhaust valve 26 abuts against the first lobe 34. As the camshaft 25 rotates, the end portion 36 of the exhaust valve 26 follows the first lobe 34, causing the motion of the exhaust valve head 30. The exhaust valve 26 may be biased towards its closed position, as known in the art, e.g. by means of a spring. The exhaust arrangement 14 comprises a first linkage arrangement 40 configured to change the motion of the exhaust valve head 30 caused by the first lobe 34.

The camshaft 25 is arranged for controlling movement of the intake valve 42, and opening and closing of the intake valve 42. Namely, the camshaft 25 comprises a second lobe 35, shown with broken lines in FIG. 2, configured to abut against the intake valve 42. Thus, at least a portion of the intake valve 42 will follow a contour of the second lobe 35. Accordingly, the second lobe 35 is configured to cause a motion of the intake valve head 31 for opening and closing the intake opening 29. Put differently, the second lobe 35 provides an input to the intake valve head 31, i.e. the second lobe 35 forms a cam, which is followed by an end portion 37 of the intake valve 42. The second lobe 35 is eccentrically arranged on the camshaft 25. The end portion 37 of the intake valve 42 abuts against the second lobe 35. As the camshaft 25 rotates, the end portion 37 of the intake valve 42 follows the second lobe 35, causing the motion of the intake valve head 31. The intake valve 42 may be biased towards its closed position, as known in the art, e.g. by means of a spring. The intake arrangement 16 comprises a second linkage arrangement 41 configured to change the motion of the intake valve head 31 caused by the second lobe 35.

The camshaft 25 is synchronized with the crankshaft 20 to rotate at a same rotational speed as the crankshaft 20, i.e. the camshaft 25 has the same angular velocity, ω, as the crankshaft 20. The ICE 2 comprises a control unit 54 configured for controlling the first linkage arrangement 40 to selectively prevent the motion of the exhaust valve head 30. The control unit 54 is also configured for controlling the second linkage arrangement 41 to selectively prevent the motion of the intake valve head 31. Thus, the control unit 54 of the ICE 2 is configured to control the first and second linkage arrangements 40, 41 to achieve a number of different patterns for opening and closing of the exhaust valve opening 28 and the intake valve opening 29.

According to some embodiments, the cylinder arrangement 4 may have a total swept volume, $V_S$, in the cylinder bore 12 between the BDC and TDC of the piston 10, wherein $0.3<V_S<4$ litres. Mentioned purely as an example, in the lower range of Vs, the cylinder arrangement 4 may form part of an internal combustion engine for a passenger car, and in the middle and higher range of Vs, the cylinder arrangement 4 may form part of an internal combustion engine for a heavy load vehicle such as e.g. a truck, a bus, or a construction vehicle. Also in the higher range of Vs, the cylinder arrangement 4 may form part of an internal combustion engine for e.g. a generator set (genset), for marine use, or for rail bound (train) use.

Figure 3:
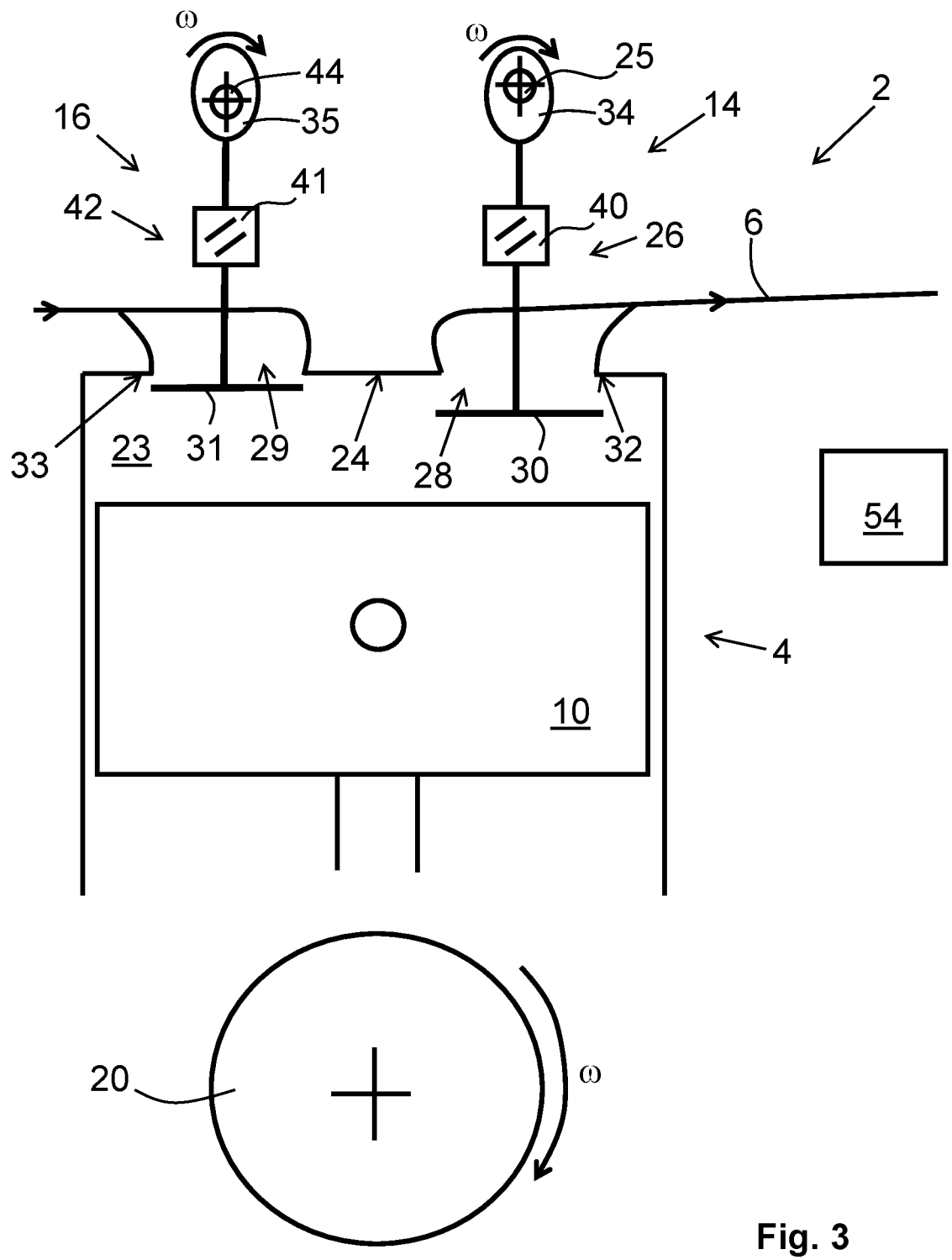

FIG. 3 schematically illustrates a four-stroke internal combustion engine, ICE 2 according to embodiments. These embodiments resemble in much the embodiments of FIGS. 1 and 2. In the following, the main differences with the embodiments of FIGS. 1 and 2 will be discussed.

Again, the ICE 2 comprises at least one cylinder arrangement 4 and a crankshaft 20, and the at least one cylinder arrangement 4 comprises a piston 10, a cylinder bore 12, an exhaust arrangement 14, an intake arrangement 16, and a fuel injection arrangement 18, and/or an ignition device. The piston 10 is arranged to reciprocate in the cylinder bore 12. Further, the ICE 2 comprises a first camshaft 25 and a second camshaft 44. The first camshaft 25 comprises the first lobe 34, and the second camshaft 44 comprises the second lobe 35.

The first camshaft 25 is arranged for controlling movement of the exhaust valve 26, including opening and closing of the exhaust valve 26. The control is achieved in the same manner as in the previously discussed embodiments. Again, the exhaust arrangement 14 comprises a first linkage arrangement 40 configured to change the motion of the exhaust valve head 30 caused by the first lobe 34. Again, the first linkage arrangement 40 is controlled by the control unit 54 of the ICE 2.

The second camshaft 44 is arranged for controlling movement of the intake valve 42, including opening and closing of the intake valve 42. The control is achieved in the same manner as in the previously discussed embodiments. Again, the intake arrangement 16 comprises a second linkage arrangement 41 configured to change the motion of the intake valve head 31 caused by the second lobe 35. Again, the second linkage arrangement 41 is controlled by the control unit 54 of the ICE 2.

Both the first and second camshafts 25, 44 are synchronized with the crankshaft 20 to rotate at a same rotational speed as the crankshaft 20, i.e. the first and second camshafts 25, 44 have the same angular velocity, ω, as the crankshaft 20. Again, the control unit 54 is configured for controlling the first linkage arrangement 40 to selectively prevent the motion of the exhaust valve head 30, and the control unit 54 is configured for controlling the second linkage arrangement 41 to selectively prevent the motion of the intake valve head 31. Thus, the control unit 54 of the ICE 2 is configured to control the first and second linkage arrangements 40, 41 to achieve a number of different patterns for opening and closing of the exhaust valve opening 28 and the intake valve opening 29.

In the following, with reference to FIGS. 4-6, various embodiments of linkage arrangements for an exhaust arrangement 14 or an intake arrangement 16 of an ICE 2 according to embodiments will be discussed. In the discussion reference will be made to the first linkage arrangement 40 utilized in an exhaust arrangement 14. However, it is understood that the same type of linkage arrangement may be utilized in an intake arrangement 16. The linkage arrangements may be used in connection with an ICE 2 comprising one camshaft 25, as well as an ICE 2 comprising a first camshaft 25 and a second camshaft 44.

Figure 4:
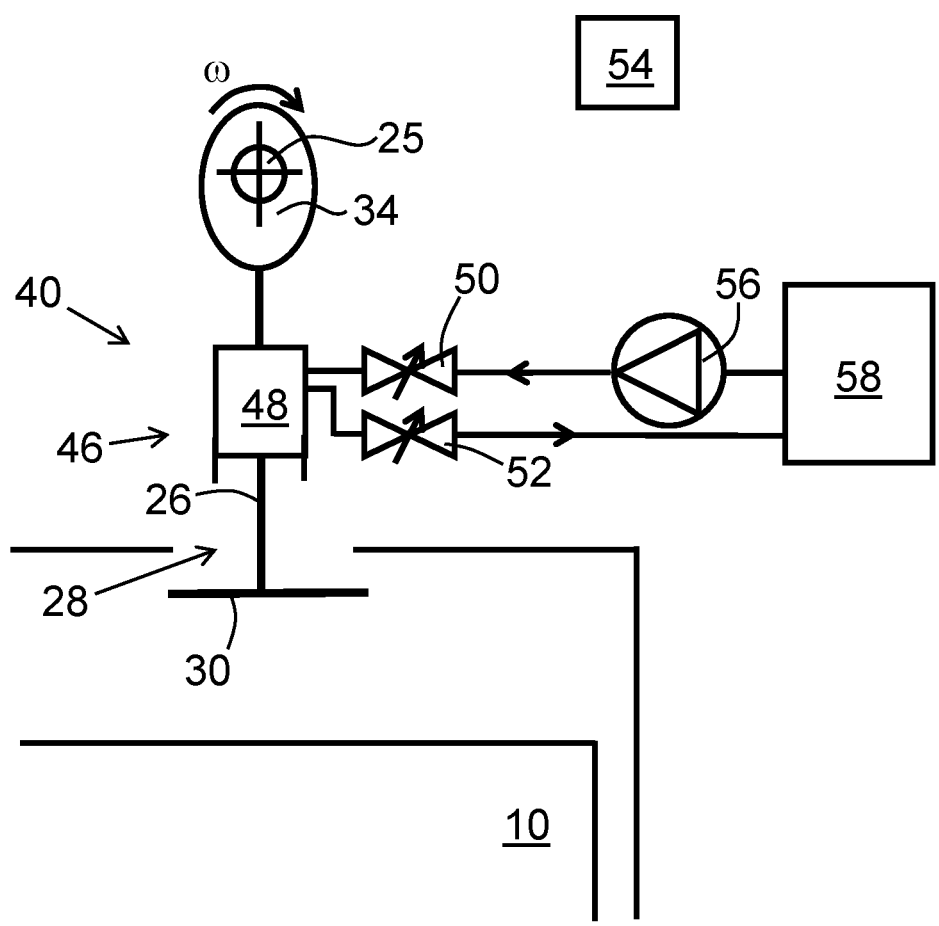
FIG. 4 illustrates schematically embodiments of a linkage arrangement comprising a hydraulic linkage, FIG. 5 schematically illustrates alternative embodiments of a linkage arrangement comprising a hydraulic linkage.

FIG. 4 illustrates schematically embodiments of a first linkage arrangement 40 comprising a hydraulic linkage 46 arranged between the camshaft 25 and the exhaust valve head 30. The hydraulic linkage 46, in a first mode, is configured to transfer an input of the first lobe 34 to the exhaust valve head 30 to cause the motion of the exhaust valve head 30. The hydraulic linkage 46, in a second mode, is configured to prevent the motion of the exhaust valve head 30. Since hydraulics are well developed and numerous constructional elements are known in the field of hydraulics, a hydraulic linkage 46 provides basis for a responsive and controllable first linkage arrangement 40.

The hydraulic linkage 46 comprises a hydraulic cylinder 48 forming part of a valve stem of the exhaust valve 26. As the camshaft 25 rotates at the same speed as the crankshaft of the ICE, the hydraulic cylinder 48 is alternately filled with, and at least partially emptied from, hydraulic liquid. An inlet valve 50 and an outlet valve 52 are controlled by a control unit 54 such that the hydraulic cylinder 48 is filled with hydraulic liquid prior to or during an exhaust stroke of the piston 10. Thus, the hydraulic linkage 46 is in the first mode. Moreover, the inlet valve 50 and the outlet valve 52 are controlled by the control unit 54 such that the outlet valve 52 is emptied from hydraulic liquid prior to and during a compression stroke of the piston 10. Thus, the hydraulic linkage 46 is in the second mode. A pump 56 may pressurize the hydraulic liquid such that when the inlet valve 50 is open, the hydraulic cylinder 48 is filled with hydraulic liquid. A tank 58 for the hydraulic liquid may be provided.

The hydraulic liquid may be hydraulic oil. The fuel of the ICE may alternative be utilized as a hydraulic liquid for the hydraulic linkage 46. Other hydraulic liquids may be used as a further alternative.

Figure 5:
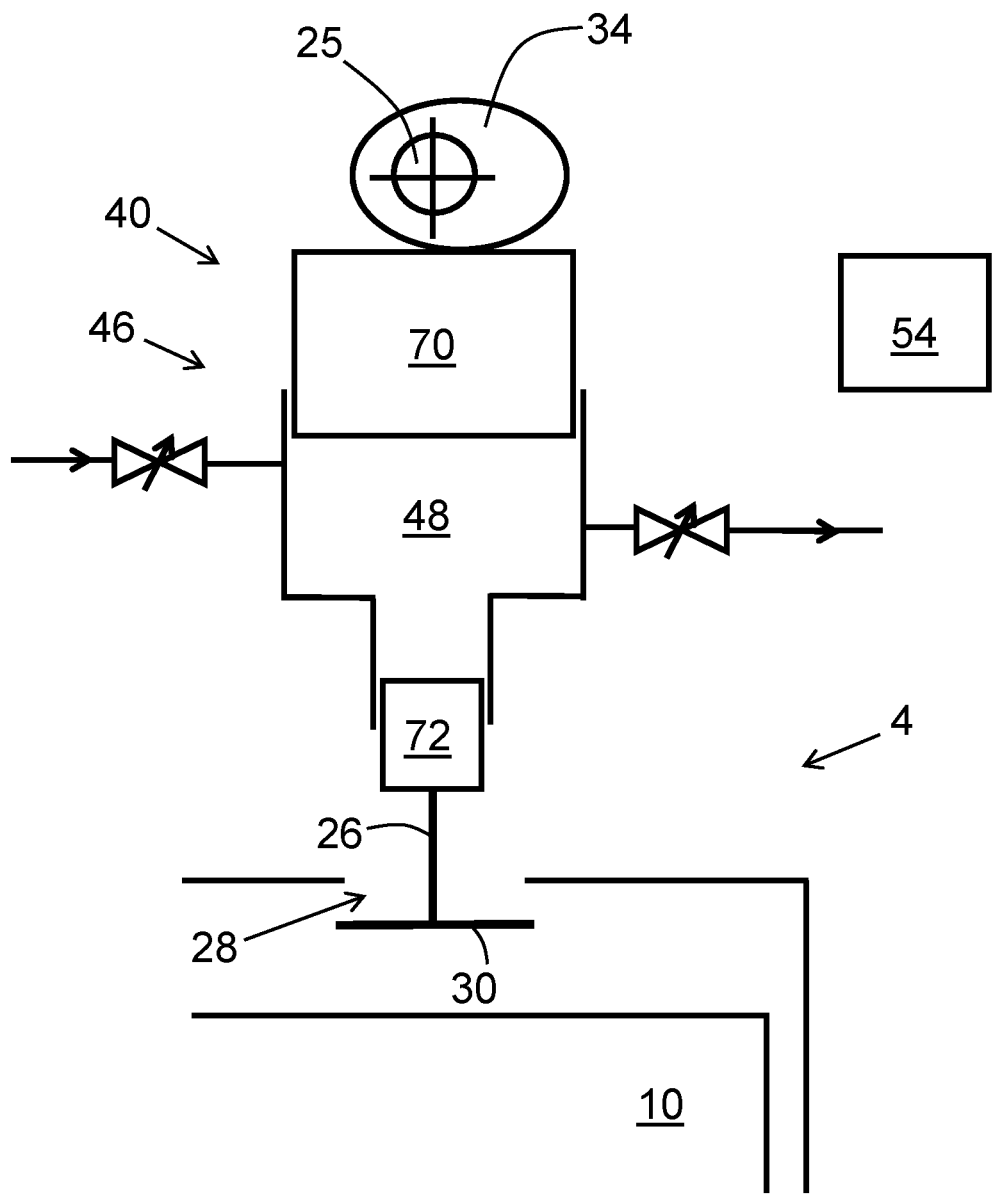

FIG. 5 schematically illustrates alternative embodiments of a first linkage arrangement 40 comprising a hydraulic linkage 46 arranged between the camshaft 25 and the exhaust valve head 30. These embodiments resemble in much the embodiments of FIG. 4. Mainly the differences between the two embodiments will be discussed in the following. Again, the hydraulic linkage 46, in a first mode, is configured to transfer an input of the first lobe 34 to the exhaust valve head 30 to cause the motion of the exhaust valve head 30. The hydraulic linkage 46, in a second mode, is configured to prevent the motion of the exhaust valve head 30.

The hydraulic linkage 46 comprises a hydraulic cylinder 48 connected to a stem of the exhaust valve 26. The hydraulic cylinder 48 comprises a first piston 70 and a second piston 72. The first piston 70 abuts against the first lobe 34 of the camshaft 25. The second piston 72 is connected to the exhaust valve head 30. Again, the hydraulic cylinder 48 is alternately filled with, and emptied from, hydraulic liquid such that the hydraulic cylinder 48 in the first mode is filled with hydraulic liquid, and in the second mode is at least partly emptied from hydraulic liquid. Thus, in the first mode, the motion of the first piston 70, caused by the first lobe 34, is transferred to the second piston 72, and in the second mode the first piston 70 does not affect the second piston 72.

According to embodiments, the hydraulic linkage 46 comprises a first piston 70 connected to the camshaft 25 and a second piston 72 connected to the exhaust valve head 30, and wherein the first piston 70 has a larger area than the second piston 72. That is, the first piston 70 has a larger area inside the hydraulic cylinder 48 than the second piston 72. Accordingly, a hydraulic gearing is achieved in the hydraulic cylinder 48. The second piston 72 will travel a longer distance than the first piston 70, proportionately to the area difference between the first and second pistons 70, 72. In addition, the speed of the second piston 72, and thus, the opening speed of the exhaust valve head 30 will be proportionately larger than the motion speed of the first piston 70 caused by the first lobe 34 in the first mode. Accordingly, the opening speed of the exhaust opening 28 may be increased above that achieved by a 1:1 gearing.

In alternative embodiments where no gearing is deemed necessary, the first and second pistons 70, 72 may have the same area inside the hydraulic cylinder 48.

Some embodiments of linkage arrangements 40, 41 comprising hydraulic linkages 46 for an ICE may be summarized e.g. in the following manner: The first linkage arrangement 40 may comprise a first hydraulic linkage 46 arranged between the at least one camshaft 25 and the exhaust valve head 30 and a second hydraulic linkage arranged between the at least one camshaft 25 and the intake valve head 31. The first hydraulic linkage 46 in a first state may be configured to transfer an input of the first lobe 34 to the exhaust valve head 30 to cause the motion of the exhaust valve head 30. The first hydraulic linkage 46 in a second state may be configured to prevent the motion of the exhaust valve head 30. The second hydraulic linkage in a first state may be configured to transfer an input of the second lobe 35 to the intake valve head to cause the motion of the intake valve head. The second hydraulic linkage in a second state may be configured to prevent the motion of the intake valve head 31, and wherein the first and second states of the first and second hydraulic linkages are controllable by the control unit 54.

Various other hydraulic linkages known in the prior art, such e.g. from U.S. Pat. No. 6,244,257, US 2007/0144467, or U.S. Pat. No. 5,996,550 may alternatively be utilized to prevent a motion of the exhaust valve head 30 such that the exhaust opening 28 remains closed, and/or to prevent a motion of the intake valve head 31 such that the intake opening 29 remains closed. Merely, the control of such hydraulic linkages, and the stroke length of such hydraulic linkages, have to be adapted to ensure that the exhaust and/or inlet valve remains closed.

Figure 6:
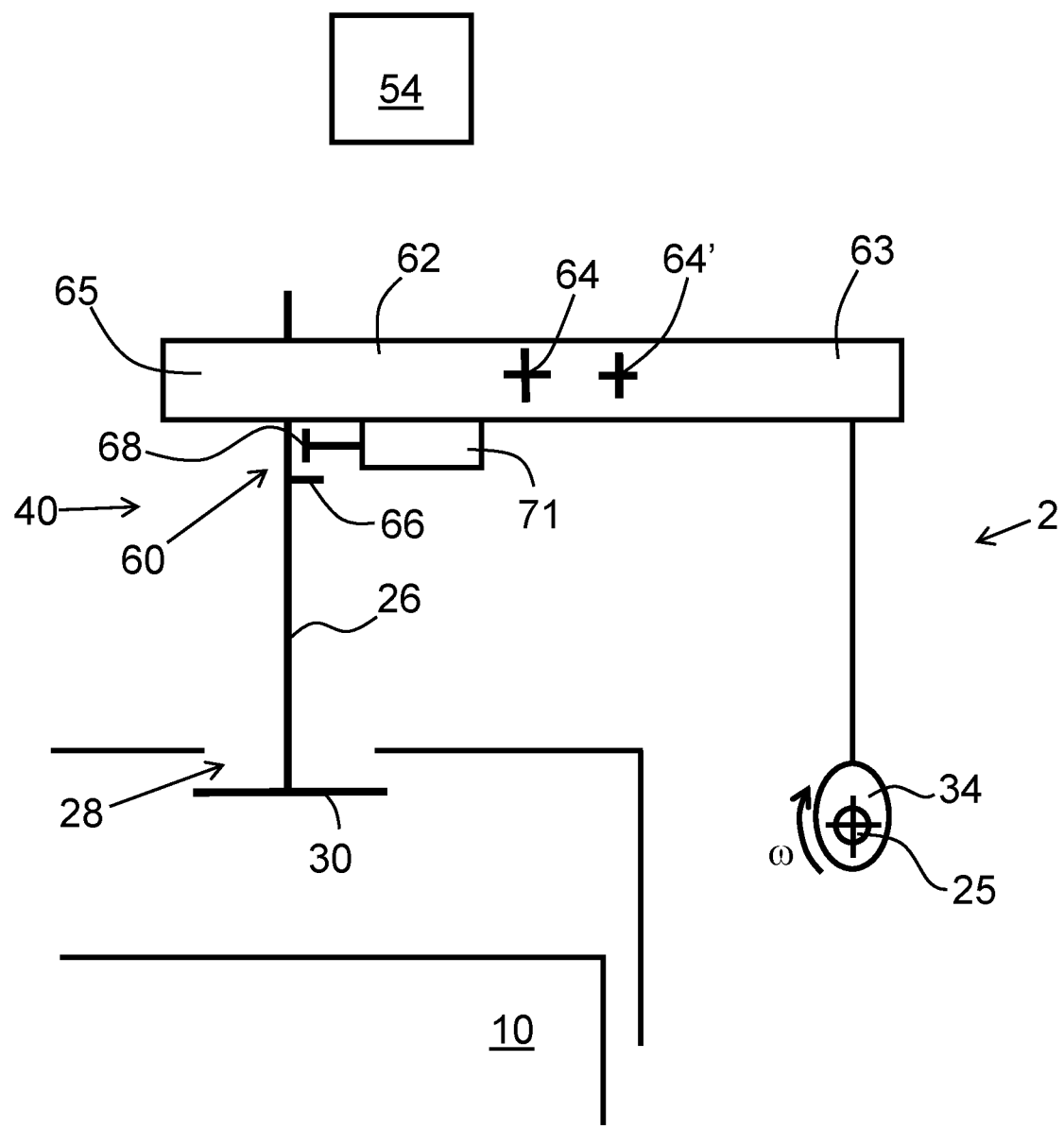
FIG. 6 illustrates embodiments of a linkage arrangement comprising a mechanical linkage, FIG. 7 schematically illustrates some of different possible opening and closing patterns of exhaust and intake valve openings, FIG. 8 schematically illustrates embodiments of a cylinder arrangement of a four-stroke ICE.

FIG. 6 illustrates embodiments of a first linkage arrangement 40 comprising a mechanical linkage 60 arranged between the camshaft 25 and the exhaust valve head 30. The mechanical linkage 60, in a first mode, may be configured to transfer an input of the first lobe 34 to the exhaust valve head 30 to cause the motion of the exhaust valve head 30. The mechanical linkage 60, in a second mode, may be configured to prevent the motion of the exhaust valve head 30. In this manner, an alternative to a hydraulic linkage may be provided.

The exhaust valve 26 is connected to a second end portion 65 of a lever 62, such as a rocker lever 62. The rocker lever 62 is pivoted back and forth about a pivot axis 64 by the camshaft 25 and its first lobe 34. Thus, the exhaust valve 26 is moved upwardly and downwardly. Again, the exhaust valve 26 may be biased towards its closed position.

Since the camshaft 25 rotates at the same rotational speed as the crankshaft of the ICE 2, every alternate downward movement of the exhaust valve 26 is eliminated by the mechanical linkage 60. For this purpose, a stem of the exhaust valve 26 is slidably arranged in the rocker lever 62 at the second end portion 65 of the lever 62 and the mechanical linkage 60 comprises a pin 66 extending from the stem of the exhaust valve 26, a blocking member 68, and an actuator 71. When the blocking member 68 is positioned between the pin 66 and the rocker lever 62, as illustrated in FIG. 6, a downward movement of the left-hand side of the rocker lever 62 is transferred to the exhaust valve 26 which accordingly, will follow the downward movement of the rocker lever 62 and open the exhaust opening 28. Every alternate rotation of the camshaft 25, i.e. during the compression stroke of the piston 10, the blocking member 68 is moved away from the pin 66 by the actuator 71. Thus, during the downward movement of the left-hand side of the rocker lever 62, the stem of the exhaust valve 26 slides within the rocker lever 62 and accordingly, the exhaust opening 28 remains closed. A control unit 54 controls the actuator 71 to move the blocking member 68 in and out of engagement between the pin 66 and the rocker lever 62 every alternate rotation of the camshaft 25.

According to embodiments, the mechanical linkage 60 comprises a lever 62 connected at a first end portion 63 to the camshaft 25 and at a second end portion 65 to the exhaust valve head 30, and wherein the lever 62 pivots about an axis 64' arranged such that the second end portion 65 has a higher traveling speed than the first end portion 63. Thus, a mechanical gearing may be achieved which increases the opening speed of the exhaust opening 28 above that achieved by a 1:1 gearing. As shown in FIG. 6 the axis 64' is offset from a midpoint in between the first and second end portions 63, 65 of the lever 62 towards the first end portion 63. The traveling speed may be e.g. an angular speed of the lever 62, or e.g. a longitudinal speed of the exhaust valve 26.

Some embodiments of linkage arrangements 40, 41 comprising mechanical linkages 60 for an ICE may be summarized e.g. in the following manner: The first linkage arrangement 40 may comprise a first mechanical linkage 60 arranged between the at least one camshaft 25 and the exhaust valve head 30 and a second mechanical linkage arranged between the at least one camshaft and the intake valve head 31. The first mechanical linkage 60 in a first state may be configured to transfer an input of the first lobe 34 to the exhaust valve head 30 to cause the motion of the exhaust valve head 30. The first mechanical linkage 60 in a second state may be configured to prevent the motion of the exhaust valve head 30. The second mechanical linkage in a first state may be configured to transfer an input of the second lobe 35 to the intake valve head 31 to cause the motion of the intake valve head 31. The second mechanical linkage in a second state may be configured to prevent the motion of the intake valve head 31. The first and second states of the first and second mechanical linkages are controllable by the control unit.

An alternative mechanical linkage may operate with two parallel arms pivotable about a pivot axis. One of the arms is fixed to a pivot axle concentric with the pivot axis and abuts against a first lobe of the camshaft. The other arm is freely pivotable about the pivot axis and connected to the exhaust valve and transfers downward movements of the arm to the exhaust valve. Operated in accordance with embodiments of the present invention, every alternate rotation of the camshaft, the two arms are locked to each other, e.g. by means of a pin extending through both arms, which will cause the first lobe of the camshaft to open the exhaust valve, and every other rotation the two arms are not locked to each other, which will cause the arm abutting against the lobe to simply pivot about the pivot axis without affecting the exhaust valve. Such a mechanical linkage resembles the Vtech™ technology by Honda®.

According to some embodiments, the at least one camshaft 25, 44 may be an overhead camshaft 25, 44 e.g. as illustrated in FIGS. 1-5. According to alternative embodiments, the at least one camshaft 25, 44 may be a camshaft arranged at the crankshaft 20.

Figure 7:
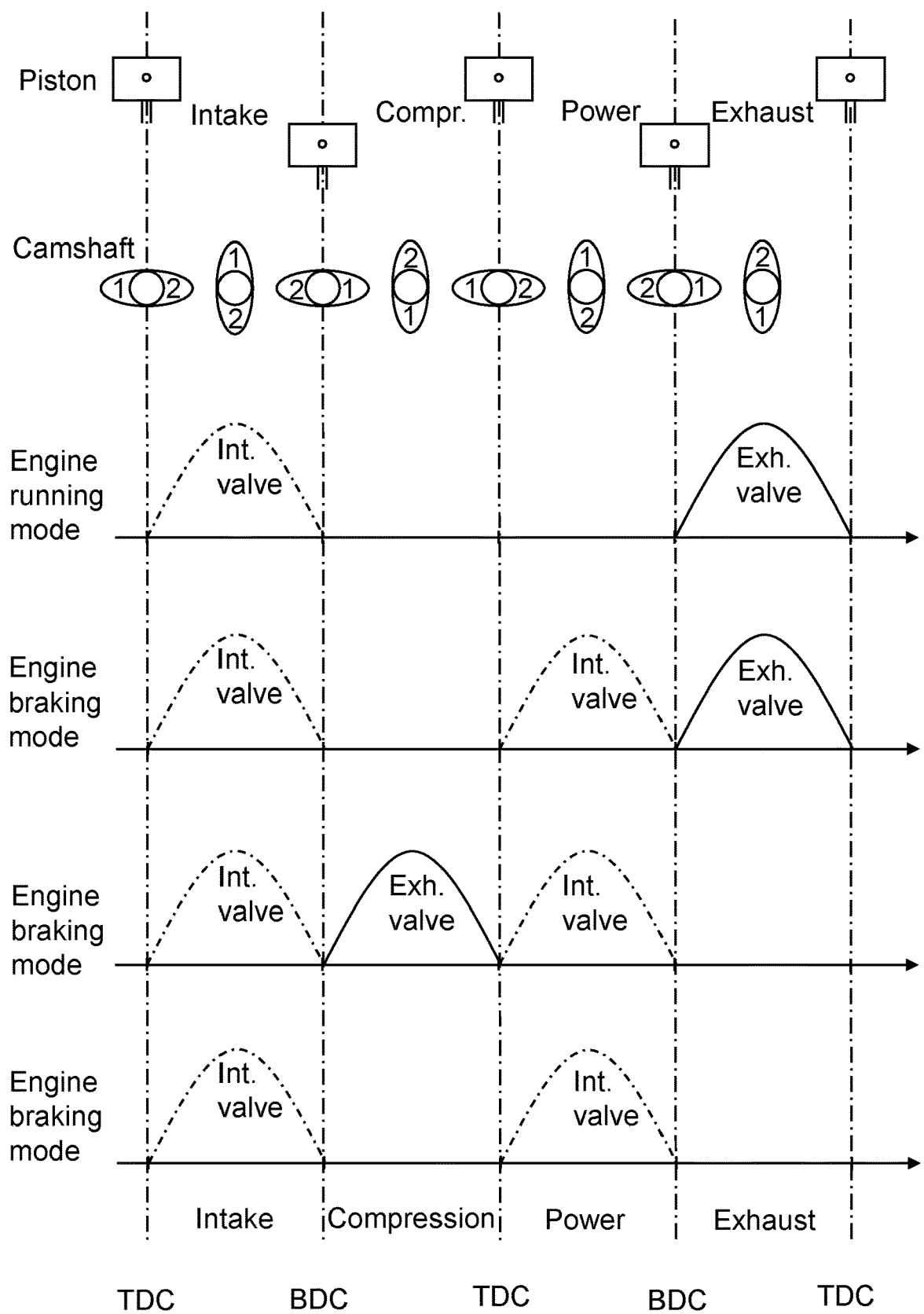

With reference to FIG. 7 some of the different possible opening and closing patterns of the exhaust and intake valve openings 28, 29 will be discussed. The patterns may also be referred to as modes. In FIG. 7 different modes of operation of an ICE 2 as shown in one of FIGS. 1-3 are visualized. Accordingly, in the following reference will be made to FIGS. 1-3 and 7. Linkage arrangements as discussed in connection with FIGS. 4-6 may be utilized.

In the top row of FIG. 7 TDC and BDC of the piston 10 as well as the four strokes of the piston 10 are indicated. At the second row of FIG. 7 positions of the first and second lobes 34, 35 are schematically shown, and indicated with numbers 1 and 2. In the following rows of FIG. 7 the opening of the exhaust and intake valve openings 28, 29 for various operating modes of the ICE 2 are indicated with schematic graphs. That is, the graphs indicate when one of the first and second lobes 34, 35 causes a motion of the relevant valve head 30, 31, as well as when a motion of the relevant valve head 30, 31 is prevented. Motion of the exhaust valve head 30 is indicated by a continuous line, and motion of the intake valve head 31 is indicated by a dashed line with dots.

According to embodiments, the control unit 54 in an engine running mode may be configured to control:
the first linkage arrangement 40 to prevent the motion of the exhaust valve head 30 otherwise caused by the first lobe 34 at every alternate rotation of the at least one camshaft 25, such that the exhaust opening 28 remains closed during the compression stroke, and
the second linkage arrangement 41 to prevent the motion of the intake valve head 31 otherwise caused by the second lobe 35 at every alternate rotation of the at least one camshaft 25 such that the intake opening 31 remains closed during the power stroke. In this manner, the ICE 2 will run in an ordinary mode of operation of a four-stroke internal combustion engine, herein also referred to as engine running mode. Fuel injected into the combustion chamber 23, or entrained with fresh gases into the combustion chamber 23, combusts e.g. at the start of the power stroke thus, driving the piston 10 and the crankshaft 20. The movements of the valve heads 30, 31 during the engine running mode is shown in the first graph of FIG. 7.

According to embodiments, the control unit 54 in an engine braking mode may be configured to control:
the first linkage arrangement 40 to prevent the motion of the exhaust valve head 30, otherwise caused by the first lobe 34 at every rotation or every alternate rotation of the at least one camshaft 25, such that the exhaust opening 28 remains closed during the compression stroke and/or the exhaust stroke. In this manner, the ICE 2 will run in a braking mode of operation, during which the exhaust valve head 30 remains closed while the piston 10 reciprocates from its BDC to its TDC during at least one of the compression stroke and/or the exhaust stroke thus, braking a rotation of the crankshaft 20. No fuel is injected into the combustion chamber 23, or entrained with gases into the combustion chamber 23, during the engine braking mode. That is, during engine braking mode no combustion takes place during the power stroke. In the engine braking mode, an internal load may be put on the ICE 2. For instance, such an internal load may be utilized for reducing a rotational speed of the crankshaft 20, or for producing hot exhaust gases from other cylinders of the relevant ICE 2, which in turn may heat up a catalytic reduction system for the exhaust gases of the ICE 2.

The intake valve head 31 may be opened during one or both of the intake stroke and/or power stroke. In one embodiment of the engine braking mode shown in the second graph of FIG. 7, the motion of the exhaust valve head 30 is prevented during the compression stroke, while during the other three strokes the valve heads 30, 31 are moved by the first and second lobes 34, 35, respectively. In an alternative embodiment of the engine braking mode, shown in the third graph of FIG. 7, the motion of the exhaust valve head 30 may be prevented during the exhaust stroke, while during the other three strokes the valve heads 30, 31 are moved by the first and second lobes 34, 35, respectively. In one embodiment of the engine braking mode shown in the fourth graph of FIG. 7, the motion of the exhaust valve head 30 is prevented during the compression stroke and during the exhaust stroke, while during the intake stroke and the power stroke the intake valve head 31 is moved by the second lobe 35.

Referring to FIGS. 1-3, according to some embodiments, the control unit 54 may be further configured for controlling the first linkage arrangement 40 to reduce the motion of the exhaust valve head 30 in time and configured for controlling the second linkage arrangement 41 to reduce the motion of the intake valve head 31 in time. In this manner, the first and second linkage arrangements 40, 41 will not only be able to prevent motions of the exhaust and intake valve heads 30, 31, but also be able to reduce the motion of the exhaust and intake valve heads 30, 31 in time, i.e. reducing a duration, during which the exhaust and/or intake openings 28, 29 are open. Reducing the motion of a valve head in time may also be referred to as, lost motion.

Reducing a motion duration of a valve head 30, 31 may entail starting a movement of at least one of the valve heads 30, 31 later than dictated by the relevant first or second lobe 34, 35, and/or ending a movement of at least one of the valve heads 30, 31 earlier than dictated by the relevant first or second lobe 34, 35. Reducing a motion duration of a valve head 30, 31, i.e. a reduction of the time during which the valve head 30, 31 is open, may for instance be utilized in embodiments wherein the first and second lobes 34, 35 are shaped such that they create an overlap, during which both the exhaust valve head 30 and the intake valve head 31 are open at a BDC and/or a TDC if the motion duration of the valve heads 30, 31 is not reduced. The overlap may be desirable during certain engine operating conditions, loads, rotational speed ranges, etc. During other engine operating conditions, loads, rotational speed ranges, etc. the overlap may be too long or may not at all be desirable and thus, may be reduced or eliminated by reducing the motion of the exhaust and/or intake valve heads 30, 31 in time.

Reduction of motion of the valve heads 30, 31 may be achieved, e.g. with one of the hydraulic linkages 46 discussed above in connection with FIGS. 4-5. An early emptying and/or a late filling of the hydraulic cylinder will reduce a motion duration of a relevant valve head 30, 31. Timing of emptying/filling of the hydraulic linkage may be controlled by the control unit 54.

Figure 8:
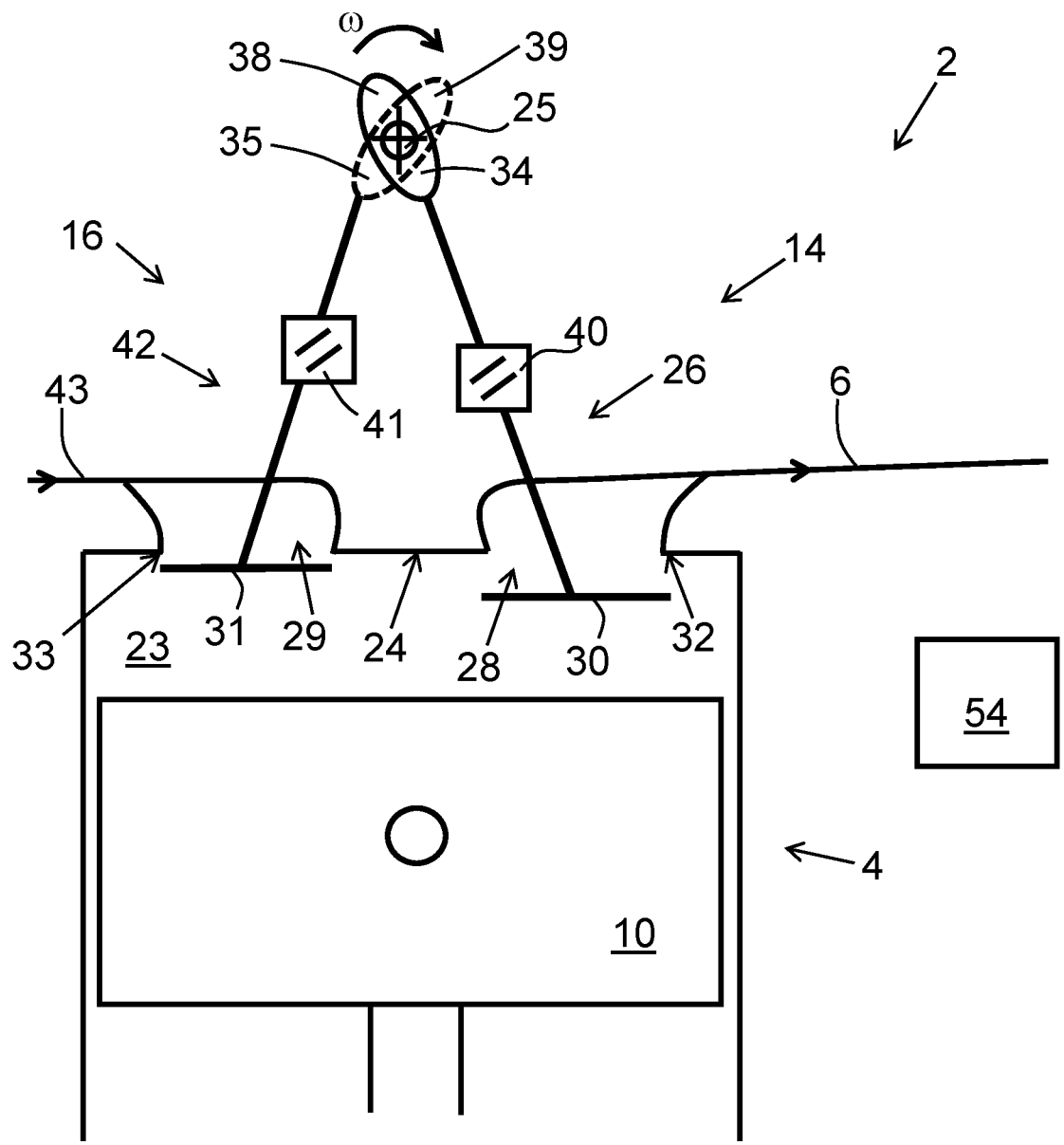

FIG. 8 schematically illustrates embodiments of at least one cylinder arrangement 4 of an ICE 2. These embodiments resemble in much the embodiments of FIGS. 1-3. Mainly the differences with the embodiments of FIGS. 1-3 will be discussed in the following.

Again, the ICE 2 comprises at least one cylinder arrangement 4, at least one camshaft 25, and a crankshaft 20. The at least one cylinder arrangement 4 comprises a piston 10, a cylinder bore 12, an exhaust arrangement 14, an intake arrangement 16, and a fuel injection arrangement, and/or an ignition device (not shown). The piston 10 is arranged to reciprocate in the cylinder bore 12.

The camshaft 25 comprise a first lobe 34 and a second lobe 35, and is arranged for controlling movement of the exhaust valve 26, and opening and closing of the exhaust valve 26, as well as controlling movement of the intake valve 42, and opening and closing of the intake valve 42. The control may be achieved in the same manner as in the previously discussed embodiments. Again, the exhaust arrangement 14 comprises a first linkage arrangement 40 configured to change the motion of the exhaust valve head 30 caused by the first lobe 34, and the intake arrangement 16 comprises a second linkage arrangement 41 configured to change the motion of the intake valve head 31 caused by the second lobe 35.

Again, the ICE 2 comprises a control unit 54 configured for controlling the first linkage arrangement 40 to selectively prevent the motion of the exhaust valve head 30, and the control unit 54 is configured for controlling the second linkage arrangement 41 to selectively prevent the motion of the intake valve head 31.

The camshaft 25 is synchronized with the crankshaft 20 to rotate at a same rotational speed as the crankshaft 20, i.e. the camshaft 25 has the same angular velocity, ω, as the crankshaft 20.

In these embodiments, the at least one camshaft 25 comprises a third lobe 38 configured to cause a motion of the exhaust valve head 30 for opening and closing the exhaust opening 28. The at least one camshaft 25 comprises a fourth lobe 39 configured to cause a motion of the intake valve head 31 for opening and closing the intake opening 29. The third lobe 38 may be arranged on the camshaft 25 substantially opposite to the first lobe 34. The fourth lobe 39 may be arranged on the camshaft 25 substantially opposite to the second lobe 35. The control unit 54 is configured for controlling the first linkage arrangement 40 to selectively prevent the motion of the exhaust valve head 30 otherwise caused by the third lobe 38, and for controlling the second linkage arrangement 41 to selectively prevent the motion of the intake valve head 31 otherwise caused by the fourth lobe 39.

In the schematically illustrates positions of the lobes 34, 35, 38, 39 in FIG. 8, the first lobe 34 provides an input to the exhaust valve head 30 to open the exhaust opening 28, while the second linkage arrangement 41 prevents the motion of the intake valve head 31 otherwise provided by the second lobe 35, to maintain the intake opening 29 closed.

The control unit 54 of the ICE 2 is configured to control the first and second linkage arrangements 40, 41 to achieve a number of different patterns for opening and closing of the exhaust valve opening 28 and the intake valve opening 29. The provision of two lobes, the first and third lobes 34, 38, for moving the exhaust valve 26, and two lobes, the second and fourth lobes 35, 39, for moving the intake valve 42, together with the first and second linkage arrangements 40, 41, provides for a flexibility in creating various patterns for opening and closing of the exhaust and intake valve openings 28, 29. Accordingly, the control unit 54 may be configured for operating the ICE 2 in various different modes, such as e.g. an engine running mode, an engine braking mode, and a zero flow mode.

For instance, the third lobe 38 may move the exhaust valve head 30 during the intake stroke and/or during the power stroke, unless the first linkage arrangement 40 prevents the motion of the exhaust valve head 30. Similarly, the fourth lobe 39 may move the intake valve head 31 during the compression stroke and/or during the exhaust stroke, unless the second linkage arrangement 41 prevents the motion of the intake valve head 31.

In an engine running mode, the at least one cylinder arrangement 4 is run through its four strokes with fuel combusting during the power stroke e.g. in order to propel a vehicle, in which the ICE 2 is mounted. In an engine braking mode, no fuel is added into the cylinder arrangement 4 and resistance of the piston 10 reciprocating in the cylinder bore is increased in order to brake the crankshaft 20. In a zero flow mode no continuous flow of gas, or only a minor flow of gas, passes through the cylinder arrangement 4 and an exhaust system of the ICE 2, and no fuel is added into the cylinder arrangement 4. In the zero flow mode the flow of gas passing through the cylinder arrangement 4 and the exhaust system of the ICE may be $1/10$, or less, of the flow of gas passing through the cylinder arrangement 4 and the exhaust system of the ICE 2 during the engine running mode. According to alternative embodiments, in the zero flow mode the flow of gas passing through the cylinder arrangement 4 and the exhaust system of the ICE may be $1/20$, or less, of the flow of gas passing through the cylinder arrangement 4 and the exhaust system of the ICE 2 during the engine running mode.

According to alternative embodiments, the ICE 2 may comprise a first camshaft 25 and a second camshaft 44, as discussed in connection with FIG. 3. In such embodiments, the first camshaft 25 may comprise the third lobe 38 and the second camshaft 44 may comprise the fourth lobe 39.

Figure 9:
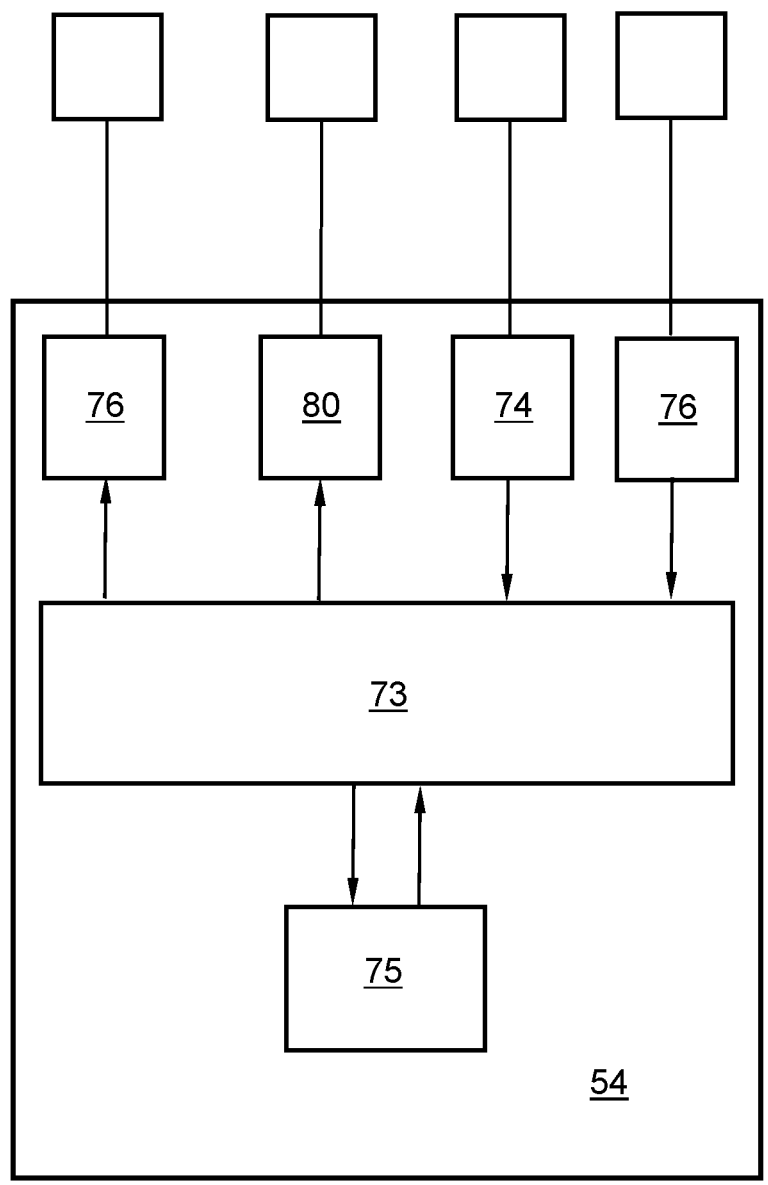
FIG. 9 illustrates a control unit, FIG. 10 schematically illustrates some of the different possible opening and closing patterns of exhaust and intake valve openings.

FIG. 9 illustrates a control unit 54 to be utilized in connection with the different aspects and/or embodiments of the invention. The control unit 54 comprises a calculation unit 73 which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilized expression "calculation unit" may represent a processing circuitry comprising a plurality of processing circuits, such as, e.g., any, some or all of the ones mentioned above. The control unit 54 comprises a memory unit 75. The calculation unit 73 is connected to the memory unit 75, which provides the calculation unit 54 with, for example, stored programme code and/or stored data which the calculation unit 73 needs to enable it to do calculations. The calculation unit 73 is also adapted to storing partial or final results of calculations in the memory unit 75. The memory unit 75 may comprise a physical device utilized to store data or programs, i.e., sequences of instructions, on a temporary or permanent basis. According to some embodiments, the memory unit 75 may comprise integrated circuits comprising silicon-based transistors. The memory unit 75 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control unit 54 is further provided with respective devices 74, 76, 78, 80 for receiving and/or sending input and output signals. These input and output signals may comprise waveforms, pulses or other attributes, which the input signal-receiving devices 74, 76, can detect as information and which signals can be converted to signals processable by the calculation unit 73. These signals are then supplied to the calculation unit 73. Output signal sending devices 78, 80 are arranged to convert calculation results from the calculation unit 73 to output signals for conveying to other parts of the engine control system and/or the component or components for which the signals are intended, such as e.g. the control of first and second linkage arrangements 40, 41. Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection. In the embodiment depicted, the invention is implemented in the control unit 54 but might alternatively be implemented wholly or partly in one or more other control units.

Figure 10:
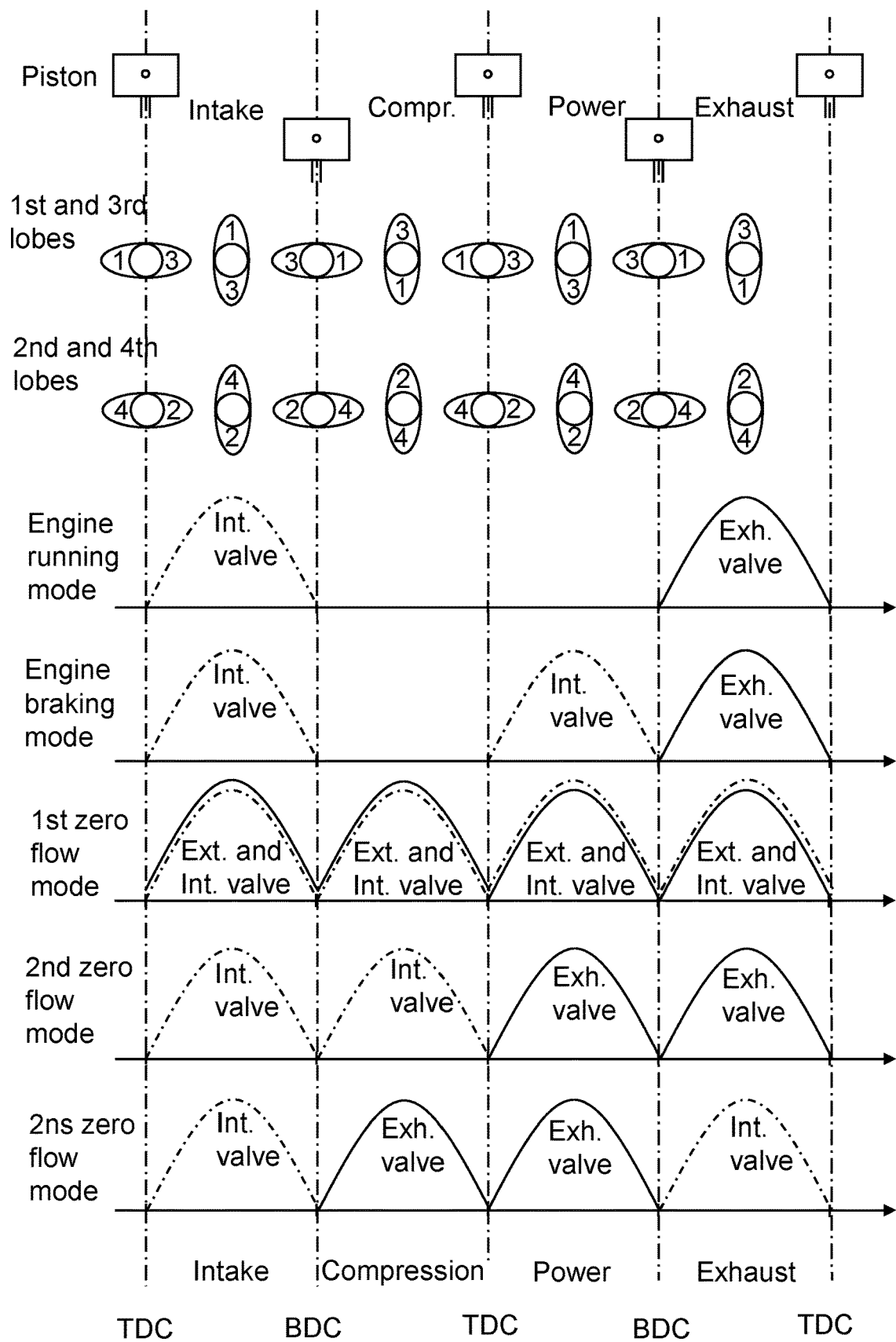

With reference to FIG. 10 some of the different possible opening and closing patterns of the exhaust and intake valve openings 28, 29 will be discussed. The patterns may also be referred to as modes. In FIG. 10 different modes of operation of an ICE 2 e.g. as shown in FIG. 8 are visualized. Accordingly, in the following reference will be made to FIGS. 8 and 10. Again, linkage arrangements as discussed in connection with FIGS. 4-6 may be utilized.

In the top row of FIG. 10 TDC and BDC of the piston 10 as well as the four strokes of the piston 10 are indicated. At the second row of FIG. 10 positions of the first and third lobes 34, 38 are schematically shown, and indicated with numbers 1 and 3. At the third row positions of the second and fourth lobes 35, 39 are schematically shown, and indicated with numbers 2 and 4. In the following rows of FIG. 10 the opening of the exhaust and intake valve openings 28, 29 for various operating modes of the ICE 2 are indicated with schematic graphs. That is, the graphs indicate when one of the first fourth lobes 34, 35, 38, 39 causes a motion of the relevant valve head 30, 31. Again, motion of the exhaust valve head 30 is indicated with a continuous line, and motion of the intake valve head 31 is indicated with a dashed line with dots.

For the engine running mode discussed above, in embodiments of the ICE 2 comprising the third and fourth lobes 38, 39, the control unit 54 may further be configured to control:
the first linkage arrangement 40 to prevent the motion of the exhaust valve head 30 otherwise caused by the third lobe 38 at every rotation of the at least one camshaft 25, such that the exhaust opening 28 remains closed during the intake stroke and the power stroke, and
the second linkage arrangement 41 to prevent the motion of the intake valve head 31 otherwise caused by the fourth lobe 39 at every rotation of the at least one camshaft 25 such that the intake opening 29 remains closed during the compression stroke and the exhaust stroke. In this manner, the ICE 2 will run in an ordinary mode of operation of a four-stroke internal combustion engine. The movements of the valve heads 30, 31 related to the first and second lobes 34, 35 are controlled as discussed above with reference to FIG. 7 and the engine running mode. Fuel injected into the combustion chamber 23, or entrained with fresh gases into the combustion chamber 23, combusts e.g. at the start of the power stroke thus, driving the crankshaft 20. The movements of the valve heads 30, 31 during the engine running mode is shown in the first graph of FIG. 10.

For embodiments of the engine braking mode discussed above, in embodiments of the ICE 2 comprising the third and fourth lobes 38, 39, the control unit 54 may further be configured to control:
the first linkage arrangement 40 to prevent the motion of the exhaust valve head 30 otherwise caused by the third lobe 38 at every rotation of the at least one camshaft 25, such that the exhaust opening 28 remains closed during the intake stroke and the power stroke, and
the second linkage arrangement 41 to prevent the motion of the intake valve head 31 otherwise caused by the fourth lobe 39 at every rotation of the at least one camshaft 25 such that the intake opening 29 remains closed during the compression stroke and the exhaust stroke. In this manner, the ICE 2 will run in a braking mode of operation, during which the exhaust valve head 30 remains closed while the piston 10 reciprocates from its BDC to its TDC during at least one of the compression stroke and/or the exhaust stroke thus, braking a rotation of the crankshaft 20. The movements of the valve heads 30, 31 related to the first and second lobes 34, 35 are controlled as discussed above with reference to FIG. 7 and the engine braking mode. No fuel is injected into the combustion chamber 23, or entrained with fresh gases into the combustion chamber 23 during the engine braking mode. The intake valve head 31 may be opened during one or both of the intake stroke and/or power stroke. In one embodiment of the engine braking mode shown in the second graph of FIG. 10, the motion of the exhaust valve head 30 is prevented during the compression stroke, while during the other three strokes the valve heads 30, 31 are moved by the first and second lobes 34, 35, respectively. The third and fourth lobes 38, 39 are prevented from moving the exhaust and intake valve heads 30, 31. Alternatively, in the engine braking mode the opening of the exhaust and intake valve heads 30, 31 may be operated e.g. as previously discussed in connection with the third and fourth graphs of FIG. 7.

According to embodiments, the control unit 54 in a first zero flow mode, may be configured to control:
the first linkage arrangement 40 to open the exhaust opening 28 during the intake stroke, the compression stroke, the power stroke, and the exhaust stroke, and
the second linkage arrangement 41 to open the intake opening 29 during the intake stroke, the compression stroke, the power stroke, and the exhaust stroke. In this manner, gas is drawn into the combustion chamber 23 and ejected back out of the combustion chamber 23 through the exhaust and intake openings 28, 29, as the piston 10 reciprocates back and forth, while the four lobes 34, 35, 38, 39 move the exhaust and intake valve heads 30, 31 to open the exhaust and intake openings 28, 29 during every stroke. Thus, limited amounts of gas are drawn back and forth in the exhaust conduit 6 and an intake conduit 43. Accordingly, the resulting volume of gas transported through the ICE 2 is substantially nought in the first zero flow mode. No fuel is supplied into the combustion chamber during the first zero flow mode. The first zero flow mode permits a cylinder of the ICE 2 to be shut off without putting a load on the ICE 2, e.g. during periods when the ICE 2 is subjected to low loads. Since no air passes through the cylinder, an aftertreatment system is not cooled down. In the third graph of FIG. 10, the motions of the exhaust and intake valve heads 30, 31 in the first zero flow mode are shown.

According to embodiments, the control unit 54 in a second zero flow mode may be configured to control:
the first linkage arrangement 40 to prevent the motion of the exhaust valve head 30 otherwise caused by the first lobe 34 and the third lobe 38 during consecutive first and second strokes of the intake stroke, the compression stroke, the power stroke, and the exhaust stroke, such that the exhaust opening 28 remains closed during the consecutive first and second strokes, and the second linkage arrangement 41 to prevent the motion of the intake valve head 31 otherwise caused by the second lobe 35 and the fourth lobe 39 during consecutive third and fourth strokes of the intake stroke, the compression stroke, the power stroke, and the exhaust stroke, such that the intake opening 29 remains closed during the consecutive third and fourth strokes, wherein the first and second strokes are different strokes of the intake stroke, the compression stroke, the power stroke, and the exhaust stroke than the third and fourth strokes. In this manner, gas is drawn into the combustion chamber 23 through the same opening of the exhaust and intake openings 28, 29 as the gas is ejected out of the combustion chamber 23. The resulting flow of gas through the ICE 2 is thus, substantially nought in the second zero flow mode. Also, the second zero flow mode permits a cylinder of the ICE 2 to be shut off without putting a load on the ICE 2, e.g. during periods when the ICE 2 is subjected to low loads. Since no air passes through the cylinder, a catalytic reduction system of the exhaust system is not cooled down. In the fourth and fifth graphs of FIG. 10 two implementations of the second zero flow mode are exemplified. The fourth graph shows the intake opening 29 being opened during the intake stroke and the compression stroke, while the exhaust opening 28 is opened during the power stroke and the exhaust stroke. The fifth graph shows the intake opening 29 being opened during the intake stroke and the exhaust stroke. The intake stroke and the exhaust stroke are consecutive strokes seen over two complete cycles of the four-stroke ICE 2. The exhaust opening 28 is opened during the compression stroke and the power stroke. In total four different implementations of the second zero flow mode are foreseen. In addition to the two implementations shown in FIG. 10, one implementation comprises the exhaust opening 28 being opened during the intake stroke and the power stroke, while the intake opening 29 is opened during the compression stroke and the exhaust stroke, and one implementation comprises the exhaust opening 28 being opened during the intake stroke and the exhaust stroke, while the intake opening 29 is opened during the compression stroke and the power stroke.

According to embodiments, the control unit 54 in a third zero flow mode may be configured to control:

the first linkage arrangement 40 to prevent the motion of the exhaust valve head 30 otherwise caused by the first lobe 34 and the third lobe 38 during the intake stroke, the compression stroke, the power stroke, and the exhaust stroke, such that the exhaust opening 28 remains closed, and the second linkage arrangement 41 to open the intake opening 29 during the intake stroke, the compression stroke, the power stroke, and the exhaust stroke, or the first linkage arrangement 40 to open the exhaust opening 28 during the intake stroke, the compression stroke, the power stroke, and the exhaust stroke, and the second linkage arrangement 41 to prevent the motion of the intake valve head 31 otherwise caused by the second lobe 35 and the fourth lobe 39 during the intake stroke, the compression stroke, the power stroke, and the exhaust stroke. In this manner, gas is drawn into the combustion chamber 23 and ejected out of the combustion chamber 23 through only one of the exhaust and intake openings 28, 29. The resulting flow of gas through the ICE 2 is thus, substantially nought in the second third flow mode. The third zero flow mode may be utilized in the same manner as the first and second zero flow modes.

Above, the modes of operation utilizing the first fourth lobes 34, 35, 38, 39 have been discussed in connection with embodiments of an ICE 2 comprising one camshaft 25. However, the same modes of operation may be performed in embodiments of an ICE 2 comprising two camshafts 25, 44, as illustrated in FIG. 3. In such embodiments the first and third lobes 34, 38 may be arranged on the first camshaft 25, and the second and fourth lobes 35, 39 may be arranged on the second camshaft 44.

Figure 11:
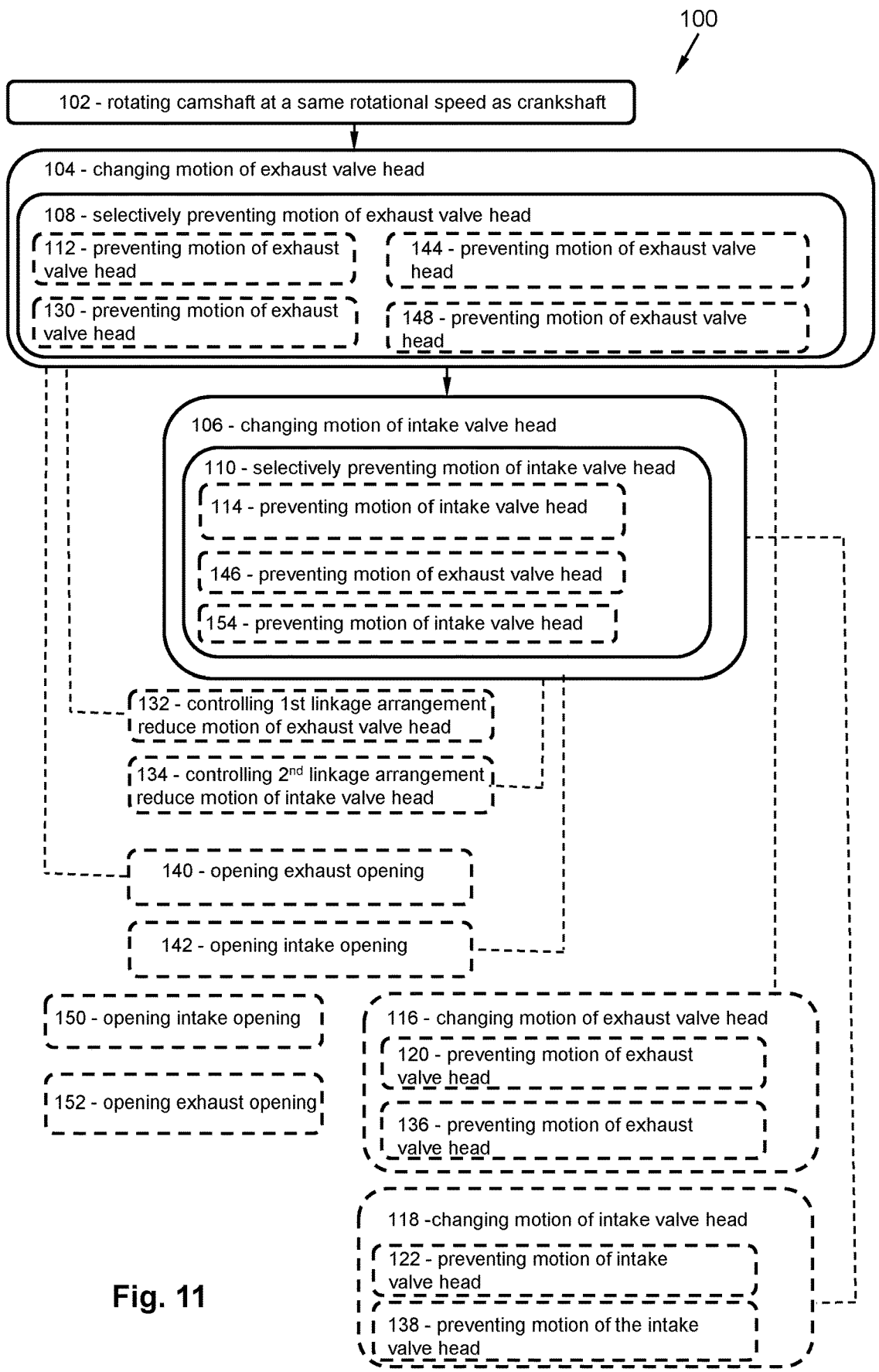
FIG. 11 illustrates embodiments of a method for controlling a four-stroke ICE.

FIG. 11 illustrates embodiments of a method 100 for controlling a four-stroke ICE according to aspects and/or embodiments discussed herein. Accordingly, reference is also made to FIGS. 1-10 in the following. The control unit 54 discussed above is accordingly configured to control one or more of the below discussed steps of the method 10.

The method 100 comprises steps of:

rotating 102 the at least one camshaft 25, 44 at a same rotational speed as the crankshaft 20, changing 104 the motion of the exhaust valve head 30 caused by the first lobe 34 by means of the first linkage arrangement 40 comprised in the exhaust arrangement 14, changing 106 the motion of the intake valve head 31 caused by the second lobe 35 by means of the second linkage arrangement 41 comprised in the intake arrangement 16, wherein the step of changing 104 the motion of the exhaust valve head 30 comprises a step of:

selectively preventing 108 the motion of the exhaust valve head 30 by means of the first linkage arrangement 40, and wherein the step of changing 106 the motion of the intake valve head 31 comprises a step of:

selectively preventing 110 the motion of the intake valve head 31 by means of the second linkage arrangement 41. In this manner, the ICE 2 may be controlled to operate not only in an ordinary engine running mode, but also in at least e.g. an engine braking mode, as discussed above with reference to inter alia FIGS. 7 and 10.

According to embodiments wherein the at least one camshaft 25, 44 comprises a first lobe 34 and a second lobe 35, in an engine running mode of the method 100, the step of selectively preventing 108 the motion of the exhaust valve head 30 may comprise a step of:

preventing 112 the motion of the exhaust valve head 30 otherwise caused by the first lobe 34 at every alternate rotation of the at least one camshaft 25, 44, such that the exhaust opening 28 remains closed during the compression stroke, and wherein the step of selectively preventing 110 the motion of the intake valve head may comprise a step of:

preventing 114 the motion of the intake valve head 31 otherwise caused by the second lobe 35 at every alternate rotation of the at least one camshaft 25, 44 such that the intake opening 29 remains closed during the power stroke. In this manner, the ICE 2 may be operated in an ordinary engine running mode, in which the piston 10 drives the at least one camshaft 25, 44, despite the at least one camshaft 25, 44 rotating at the same rotational speed as the crankshaft 20, as discussed above with reference to FIG. 7.

According to embodiments wherein the at least one camshaft 25, 44 comprises a first lobe 34 and a second lobe 35, in an engine braking mode of the method 100, the step of selectively preventing 108 the motion of the exhaust head 30 may comprise a step of:
  preventing 130 the motion of the exhaust valve head 30, otherwise caused by the first lobe 34 at every rotation or every alternate rotation of the at least one camshaft 25, such that the exhaust opening 28 remains closed during the compression stroke and/or the exhaust stroke. In this manner, the ICE 2 will run in a braking mode of operation, in which the piston 10 brakes a rotation of the crankshaft 20, as discussed above with reference to FIG. 7.

According to embodiments, the method 100 may comprise a step of:
  controlling 132 the first linkage arrangement 40 to reduce the motion of the exhaust valve head 30 in time, and
  controlling 134 the second linkage arrangement 41 to reduce the motion of the intake valve head 31 in time. In this manner, the first and second linkage arrangements 40, 41 will not only be able to prevent motions of the exhaust and intake valve heads 30, 31, but also be able to reduce the motion of the exhaust and intake valve heads 30, 31 in time. Such reduction in motion of the exhaust and intake valve heads 30, 31 is utilized to reduce a time period, during which the exhaust and/or intake openings 28, 29 are open, as discussed above.

According to embodiments, wherein the at least one camshaft 25, 44 comprises a third lobe 38 and a fourth lobe 39, the method 100 may comprise further steps of:
  changing 116 the motion of the exhaust valve head 30 caused by the third lobe 38 by means of a first linkage arrangement 40,
  changing 118 the motion of the intake valve head 31 caused by the fourth lobe 39 by means of a second linkage arrangement 41. In the engine running mode of the method 100, the step of changing 116 the motion of the exhaust valve head 30 caused by the third lobe 38 may comprise a step of:
  preventing 120 the motion of the exhaust valve head 30 otherwise caused by the third lobe 38 at every rotation of the at least one camshaft 25, 44, such that the exhaust opening 28 remains closed during the intake stroke and the power stroke, and the step of changing 118 the motion of the intake valve head 31 caused by the fourth lobe 39 comprises a step of:
  preventing 122 the motion of the intake valve head 31 otherwise caused by the fourth lobe 39 at every rotation of the at least one camshaft 25, 44 such that the intake opening 29 remains closed during the compression stroke and the exhaust stroke. In this manner, the ICE 2 may be operated in an ordinary engine running mode, in which the piston 10 drives the at least one camshaft 25, 44, despite the at least one camshaft 25, 44 rotating at the same rotational speed as the crankshaft 20, as discussed above with reference to FIG. 10.

According to embodiments wherein the at least one camshaft 25, 44 comprises the third and fourth lobes 38, 39, and the method 100 comprises the steps of:
  changing 116 the motion of the exhaust valve head 30 caused by the third lobe 38 by means of a first linkage arrangement 40,
  changing 118 the motion of the intake valve head 31 caused by the fourth lobe 39 by means of a second linkage arrangement 41. In the engine braking mode of the method 100, the step of changing 116 the motion of the exhaust valve head 30 caused by the third lobe 38 may comprise a step of:
  preventing 136 the motion of the exhaust valve head 30 otherwise caused by the third lobe 38 at every rotation of the at least one camshaft 25, such that the exhaust opening 28 remains closed during the intake stroke and the power stroke, and the step of changing 118 the motion of the intake valve head 31 caused by the fourth lobe 39 comprises a step of:
  preventing 138 the motion of the intake valve head 31 otherwise caused by the fourth lobe 39 at every rotation of the at least one camshaft 25 such that the intake opening 29 remains closed during the compression stroke and the exhaust stroke. In this manner, the ICE 2 will run in a braking mode of operation, during which the piston 10 brakes the rotation of the crankshaft 20, as discussed above with reference to FIGS. 10 and 7.

According to embodiments wherein the at least one camshaft 25, 44 comprises the third and fourth lobes 38, 39, in a first zero flow mode, the method 100 may comprise steps of:
  opening 140 the exhaust opening 28 during the intake stroke, the compression stroke, the power stroke, and the exhaust stroke, and
  opening 142 the intake opening 29 during the intake stroke, the compression stroke, the power stroke, and the exhaust stroke. In this manner, gas flow through the ICE 2 is substantially nought in the first zero flow mode, as discussed above with reference to FIG. 10.

According to embodiments wherein the at least one camshaft 25, 44 comprises the third and fourth lobes 38, 39, in a second zero flow mode of the method 100, the step of selectively preventing 108 the motion of the exhaust valve head 30 may comprise a step of:
  preventing 144 the motion of the exhaust valve head 30 otherwise caused by the first lobe 34 and the third lobe 38 during consecutive first and second strokes of the intake stroke, the compression stroke, the power stroke, and the exhaust stroke, such that the exhaust opening 28 remains closed during the consecutive first and second strokes, wherein the step of selectively preventing 110 the motion of the intake valve head 31 may comprise a step of:
  preventing 146 the motion of the intake valve head 31 otherwise caused by the second lobe 35 and the fourth lobe 39 during consecutive third and fourth strokes of the intake stroke, the compression stroke, the power stroke, and the exhaust stroke, such that the intake opening 29 remains closed during the consecutive third and fourth strokes, and wherein the first and second strokes are different strokes of the intake stroke, the compression stroke, the power stroke, and the exhaust stroke than the third and fourth strokes. In this manner, gas flow through the ICE 2 is substantially nought in the second zero flow mode, as discussed above with reference to FIG. 10.

According to embodiments wherein the at least one camshaft 25, 44 comprises the third and fourth lobes 38, 39, in a first implementation of a third zero flow mode of the method 100, the step of selectively preventing 108 the motion of the exhaust valve head 30 may comprise a step of:
  preventing 148 the motion of the exhaust valve head 30 otherwise caused by the first lobe 34 and the third lobe 38 during the intake stroke, the compression stroke, the power stroke, and the exhaust stroke, such that the exhaust opening 28 remains closed, and the method 100 may comprise a step of:
opening 150 the intake opening 29 during the intake stroke, the compression stroke, the power stroke, and the exhaust stroke.

According to embodiments wherein the at least one camshaft 25, 44 comprises the third and fourth lobes 38, 39, in a second implementation of a third zero flow mode the method 100 may comprise a step of:
opening 152 the exhaust opening 28 during the intake stroke, the compression stroke, the power stroke, and the exhaust stroke, and the step of selectively preventing 110 the motion of the intake valve head may comprise a step of:
preventing 154 the motion of the intake valve head 31 otherwise caused by the second lobe 35 and the fourth lobe 39 during the intake stroke, the compression stroke, the power stroke, and the exhaust stroke.

In this manner, gas flow through the ICE 2 is substantially nought in the first and second implantations of third zero flow mode, as discussed above.

One skilled in the art will appreciate that the method 100 for controlling a four-stroke internal combustion engine may be implemented by programmed instructions. These programmed instructions are typically constituted by a computer program, which, when it is executed in a computer or control unit, ensures that the computer or control unit carries out the desired control, such as at least some of the method steps 102-154 according to some embodiments. The computer program is usually part of a computer programme product, which comprises a suitable digital storage medium on which the computer program is stored.

Thus, according to a further aspect of the invention there is provided a computer program for performing a method 100 for controlling a four-stroke internal combustion engine, wherein the computer program comprises computer readable code configured to cause one or more calculation units of one or more control units to perform a method 100 according to any one of aspects and/or embodiments discussed herein.

Figure 12:
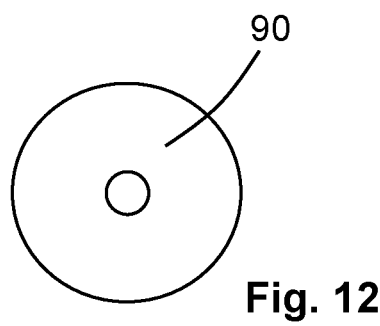
FIG. 12 illustrates a computer program product according to embodiments.

According to a further aspect of the invention there is provided a computer program product 90 for performing a method 100 for controlling a four-stroke internal combustion engine, wherein the computer program product 90 comprises computer readable code configured to cause a one or more calculation units of one or more control units to perform a method 100 according to any one of aspects and/or embodiments discussed herein. FIG. 12 illustrates a computer program product 90 according to embodiments comprising a CD ROM disc 90.

The computer program product 90 may be provided for instance in the form of a data carrier carrying computer program code for performing at least some of the steps 102-154 according to some embodiments when being loaded into the one or more calculation units 73 of the control unit 54, see FIG. 9. The data carrier may be, e.g. a ROM (read-only memory), a PROM (programmable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control unit 54 remotely, e.g., over an Internet or an intranet connection, or via other wired or wireless communication systems.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims. The four-stroke ICE may for instance comprise more than one cylinder arrangement. The four-stroke ICE may comprise more than one exhaust valve. The at least one camshaft may comprise one first lobe for each exhaust valve. Each exhaust arrangement may comprise a first linkage arrangement for each exhaust valve. Thus, each first linkage arrangement may be configured to change the motion of each exhaust valve head caused by each of the first lobes. A control unit of the ICE may be configured for controlling each of the first linkage arrangements to selectively prevent the motion of each of the exhaust valve heads, either collectively or for one exhaust valve head at a time. The four-stroke ICE may comprise more than one intake valve. The at least one camshaft may comprise one second lobe for each intake valve. Each intake arrangement may comprise a second linkage arrangement for each intake valve. Thus, each second linkage arrangement may be configured to change the motion of each intake valve head caused by each of the second lobes. A control unit of the ICE may be configured for controlling each of the second linkage arrangements to selectively prevent the motion of each of the intake valve heads, either collectively or for one intake valve head at a time. Similarly, the at least one camshaft may comprise one third lobe for each exhaust valve and one fourth lobe for each intake valve.

The invention claimed is:
1. A four-stroke internal combustion engine comprising:
a crankshaft;
at least one cylinder arrangement forming a combustion chamber and comprising a cylinder bore, a piston arranged to reciprocate in the cylinder bore, a connecting rod connecting the piston to the crankshaft;
an exhaust arrangement comprising an exhaust valve, an exhaust opening, and an exhaust valve head configured to seal against an exhaust valve seat of the exhaust opening;
an intake arrangement comprising an intake valve and an intake opening, the intake valve comprising an intake valve head configured to seal against an intake valve seat of the intake opening; and
at least one camshaft comprising:
a first lobe configured to cause a first motion of the exhaust valve head, so as to open and close the exhaust opening, via a first linkage arrangement;
a second lobe configured to cause a first motion of the intake valve head, so as to open and close the intake opening, via a second linkage arrangement, wherein the at least one camshaft is synchronized with the crankshaft to rotate at a same rotational speed as the crankshaft;
a third lobe configured to cause a second motion of the exhaust valve head, so as to open and close the exhaust opening, via the first linkage arrangement; and
a fourth lobe configured to cause a second motion of the intake valve head, so as to open and close the intake opening, via the second linkage arrangement, wherein the piston performs a four stroke operation in the cylinder bore, corresponding to an intake stroke, a compression stroke, a power stroke, and an exhaust stroke, wherein the first linkage arrangement is configured to change the first and second motions of the exhaust valve head by selectively switching between an activated lift and a deactivated lift of the exhaust valve head, wherein the second linkage arrangement is configured to change the first and second motions of the intake valve head by selectively switching between an activated lift and a deactivated lift of the intake valve head; and wherein the first linkage arrangement and the second linkage arrangement are controlled by a control unit.

2. The four-stroke internal combustion engine according to claim 1, wherein the first linkage arrangement, during the activated lift of the exhaust valve head, is further configured to selectively reduce an open time duration of the exhaust valve head from a normal open time duration of the exhaust valve head, and wherein the second linkage arrangement, during the activated lift of the intake valve head, is further configured to selectively reduce an open time duration of the intake valve head from a normal open time duration-of the intake valve head.

3. The four-stroke internal combustion engine according to claim 1, wherein the first linkage arrangement comprises a first hydraulic linkage arranged between the at least one camshaft and the exhaust valve head, and the second linkage arrangement comprises a second hydraulic linkage arranged between the at least one camshaft and the intake valve head, wherein, in a first state, the first hydraulic linkage switches to the activated lift of the exhaust valve head, wherein, in a second state, the first hydraulic linkage switches to the deactivated lift of the exhaust valve head, wherein, in a first state, the second hydraulic linkage switches to the activated lift of the intake valve head, wherein, in a second state, the second hydraulic linkage switches to the deactivated lift of the intake valve head, and wherein the first and second states of the first and second hydraulic linkages are controlled by the control unit.

4. The four-stroke internal combustion engine according to claim 1, wherein the first linkage arrangement comprises a first mechanical linkage arranged between the at least one camshaft and the exhaust valve head, and the second linkage arrangement comprises a second mechanical linkage arranged between the at least one camshaft and the intake valve head, wherein, in a first state, the first mechanical linkage switches to the activated lift of the exhaust valve head, wherein, in a second state, the first mechanical linkage switches to the deactivated lift of the exhaust valve head, wherein, in a first state, the second mechanical linkage switches to the activated lift of the intake valve head, wherein, in a second state, the second mechanical linkage switches to the deactivated lift of the intake valve head, and wherein the first and second states of the first and second mechanical linkages are controlled by the control unit.

5. The four-stroke internal combustion engine according to claim 1, wherein the control unit in an engine running mode is configured to:

switch the first linkage arrangement to the deactivated lift of the exhaust valve head at every alternate rotation of the at least one camshaft such that the exhaust opening remains closed during the compression stroke, and switch the second linkage arrangement to the deactivated lift of the intake valve head at every alternate rotation of the at least one camshaft such that the intake opening remains closed during the power stroke.

6. The four-stroke internal combustion engine according to claim 5, wherein the control unit in the engine running mode is further configured to:

switch the first linkage arrangement to the deactivated lift of the exhaust valve head at every rotation of the at least one camshaft such that the exhaust opening remains closed during the intake stroke and the power stroke, and switch the second linkage arrangement to the deactivated lift of the intake valve head at every rotation of the at least one camshaft such that the intake opening remains closed during the compression stroke and the exhaust stroke.

7. The four-stroke internal combustion engine according to claim 1, wherein the control unit in an engine braking mode is configured to:

switch the first linkage arrangement to the deactivated lift of the exhaust valve head at every rotation or every alternate rotation of the at least one camshaft such that the exhaust opening remains closed during the compression stroke and/or during the exhaust stroke.

8. The four-stroke internal combustion engine according to claim 7, wherein the control unit in the engine braking mode is further configured to:

switch the first linkage arrangement to the deactivated lift of the exhaust valve head at every rotation of the at least one camshaft such that the exhaust opening remains closed during the intake stroke and the power stroke, and switch the second linkage arrangement to the deactivated lift of the intake valve head at every rotation of the at least one camshaft such that the intake opening remains closed during the compression stroke and the exhaust stroke.

9. The four-stroke internal combustion engine according to claim 1, wherein the control unit in a first zero flow mode is configured to:

open the exhaust opening and the intake opening during the intake stroke, the compression stroke, the power stroke, and the exhaust stroke.

10. The four-stroke internal combustion engine according to claim 1, wherein the control unit in a second zero flow mode is configured to:

switch the first linkage arrangement to the deactivated lift of the exhaust valve head during consecutive first and second strokes of the four stroke operation such that the exhaust opening remains closed during the consecutive first and second strokes, and switch the second linkage arrangement to the deactivated lift of the intake valve head during consecutive third and fourth strokes of the four stroke operation such that the intake opening remains closed during the consecutive third and fourth strokes, wherein the first and second strokes are different strokes from the third and fourth strokes.

11. A vehicle comprising a four-stroke internal combustion engine according to claim 1.

12. A method for controlling a four-stroke internal combustion engine, the four-stroke internal combustion engine comprising:
- a crankshaft;
- at least one cylinder arrangement forming a combustion chamber and comprising a cylinder bore, a piston arranged to reciprocate in the cylinder bore, a connecting rod connecting the piston to the crankshaft;
- an exhaust arrangement comprising an exhaust valve and an exhaust opening, the exhaust valve comprising an exhaust valve head configured to seal against an exhaust valve seat of the exhaust opening;
- an intake arrangement comprising an intake valve and an intake opening, the intake valve comprising an intake valve head configured to seal against an intake valve seat of the intake opening; and
- at least one camshaft comprising:
  - a first lobe configured to cause a first motion of the exhaust valve head, so as to open and close the exhaust opening, via a first linkage arrangement,
  - a second lobe configured to cause a first motion of the intake valve head, so as to open and close the intake opening, via a second linkage arrangement;
  - a third lobe configured to cause a second motion of the exhaust valve head, so as to open and close the exhaust opening, via the first linkage arrangement; and
  - a fourth lobe configured to cause a second motion of the intake valve head, so as to open and close the intake opening, via the second linkage arrangement,
- wherein the piston performs a four stroke operation in the cylinder bore, corresponding to an intake stroke, a compression stroke, a power stroke, and an exhaust stroke, the method comprising:
  - rotating the at least one camshaft at a same rotational speed as the crankshaft;
  - changing the first and second motions of the exhaust valve head by selectively switching the first linkage arrangement between an activated lift and a deactivated lift of the exhaust valve head;
  - changing the first and second motions of the intake valve head by selectively switching the second linkage arrangement between an activated lift and a deactivated lift of the intake valve head;
  - wherein the at least one cylinder arrangement is configured to drive the crankshaft in a four-stroke engine running mode only and the first linkage arrangement is switched to the deactivated lift of the exhaust valve head at every alternate rotation of the at least one camshaft such that the exhaust opening remains closed during the compression stroke, and
  - wherein the second linkage arrangement is switched to the deactivated lift of the intake valve head at every alternate rotation of the at least one camshaft such that the intake opening remains closed during the power stroke.

13. The method according to claim 12, wherein in an engine braking mode, the method further comprising:
- switching the first linkage arrangement to the deactivated lift of the exhaust valve head at every rotation or every alternate rotation of the at least one camshaft such that the exhaust opening remains closed during the compression stroke and/or the exhaust stroke.

14. A computer program product comprising computer program code stored on a non-transitory computer-readable medium, said computer program product configured to execute the method of claim 12.

* * * * *